US011078722B2

(12) United States Patent
Ammerlaan et al.

(10) Patent No.: US 11,078,722 B2
(45) Date of Patent: Aug. 3, 2021

(54) VARIABLE LENGTH SCREEN, SYSTEM COMPRISING THE SAME AND METHOD FOR MANUFACTURING

(71) Applicant: Nederlandse Organisatie voor toegepast-natuurwetenschappelijk onderzoek TNO, 's-Gravenhage (NL)

(72) Inventors: Johannes Andreas Maria Ammerlaan, 's-Gravenhage (NL); Hieronymus Antonius Josephus Maria Andriessen, 's-Gravenhage (NL); Gerardus Titus van Heck, 's-Gravenhage (NL); Jeroen van den Brand, 's-Gravenhage (NL); Harmannus Franciscus Maria Schoo, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 313 days.

(21) Appl. No.: 16/063,002

(22) PCT Filed: Dec. 16, 2016

(86) PCT No.: PCT/NL2016/050879
§ 371 (c)(1),
(2) Date: Jun. 15, 2018

(87) PCT Pub. No.: WO2017/105236
PCT Pub. Date: Jun. 22, 2017

(65) Prior Publication Data
US 2018/0363366 A1 Dec. 20, 2018

(30) Foreign Application Priority Data
Dec. 18, 2015 (EP) ..................... 15201384

(51) Int. Cl.
*E06B 9/262* (2006.01)
*E06B 9/24* (2006.01)
(Continued)

(52) U.S. Cl.
CPC .............. *E06B 9/262* (2013.01); *E04F 10/02* (2013.01); *E06B 9/24* (2013.01); *E06B 9/386* (2013.01); *E06B 2009/2476* (2013.01)

(58) Field of Classification Search
CPC . E06B 9/262; E06B 9/24; E06B 9/386; E06B 2009/2476; E04F 10/02
(Continued)

(56) References Cited

U.S. PATENT DOCUMENTS

2011/0048656 A1* 3/2011 Chu ..................... H02S 30/20
160/310
2015/0068569 A1 3/2015 Shargani

FOREIGN PATENT DOCUMENTS

EP 2020467 A1 2/2009
WO WO 2006/032077 A1 3/2006

OTHER PUBLICATIONS

European Patent Office, International Search Report in corresponding International Application No. PCT/NL2016/050879 dated Feb. 28, 2017 (2 pages).

* cited by examiner

Primary Examiner — Justin V Lewis
(74) Attorney, Agent, or Firm — Leydig, Voit & Mayer, Ltd.

(57) ABSTRACT

A screen (1) is provided comprising at least a first and a second elongate guidance element (27, 28) extending in a first direction (D1) and a structured foil (10) with a front surface and a back surface, having a variable length (L) in a first direction (D1) carried by the elongate guidance elements. The screen has slat shaped portions (11$a$1+11$a$2,
(Continued)

11*b*1+11*b*2) and connection portions (12*ab*, 2*ab'*) bridging the slat shaped portions. The slat shaped portions, which extend in a second direction (D2) transverse to the first direction are provided with photovoltaic elements (20) that are connectable to external terminals for supply of electric energy. The slate shaped portions are slidably coupled with the guidance elements, to allow them to slide in said first direction along said guidance elements. The connection portions are configured to flex in a direction transverse to the first and the second direction, so as to allow the at least a first and a second slat shaped portion to shift relative to each other in said first direction.

12 Claims, 17 Drawing Sheets

(51) Int. Cl.
*E06B 9/386* (2006.01)
*E04F 10/02* (2006.01)

(58) Field of Classification Search
USPC ......... 160/84.01, 84.02, 84.03, 84.04, 84.08, 160/130, 133, 900
See application file for complete search history.

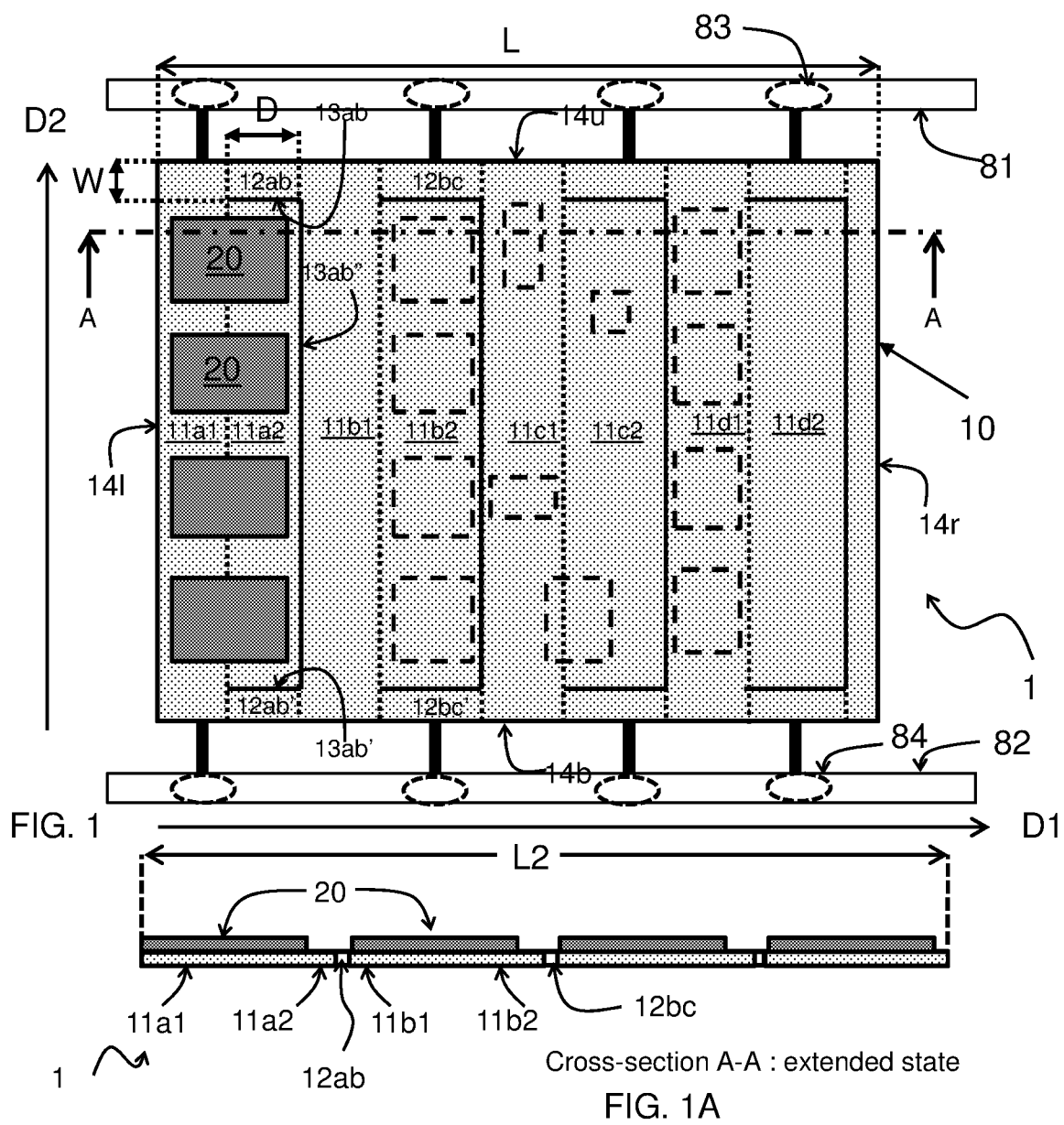
FIG. 1
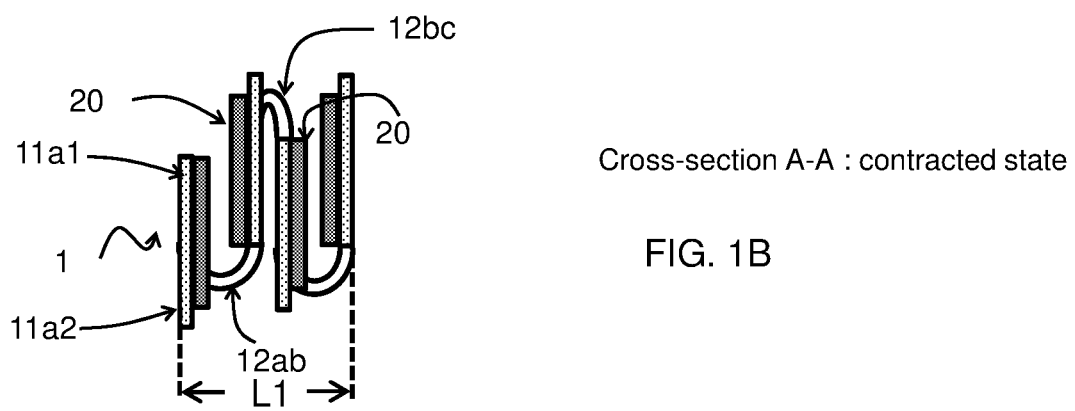
Cross-section A-A : extended state
FIG. 1A
Cross-section A-A : contracted state
FIG. 1B Cross-section A-A : extended state Cross-section A-A : contracted state

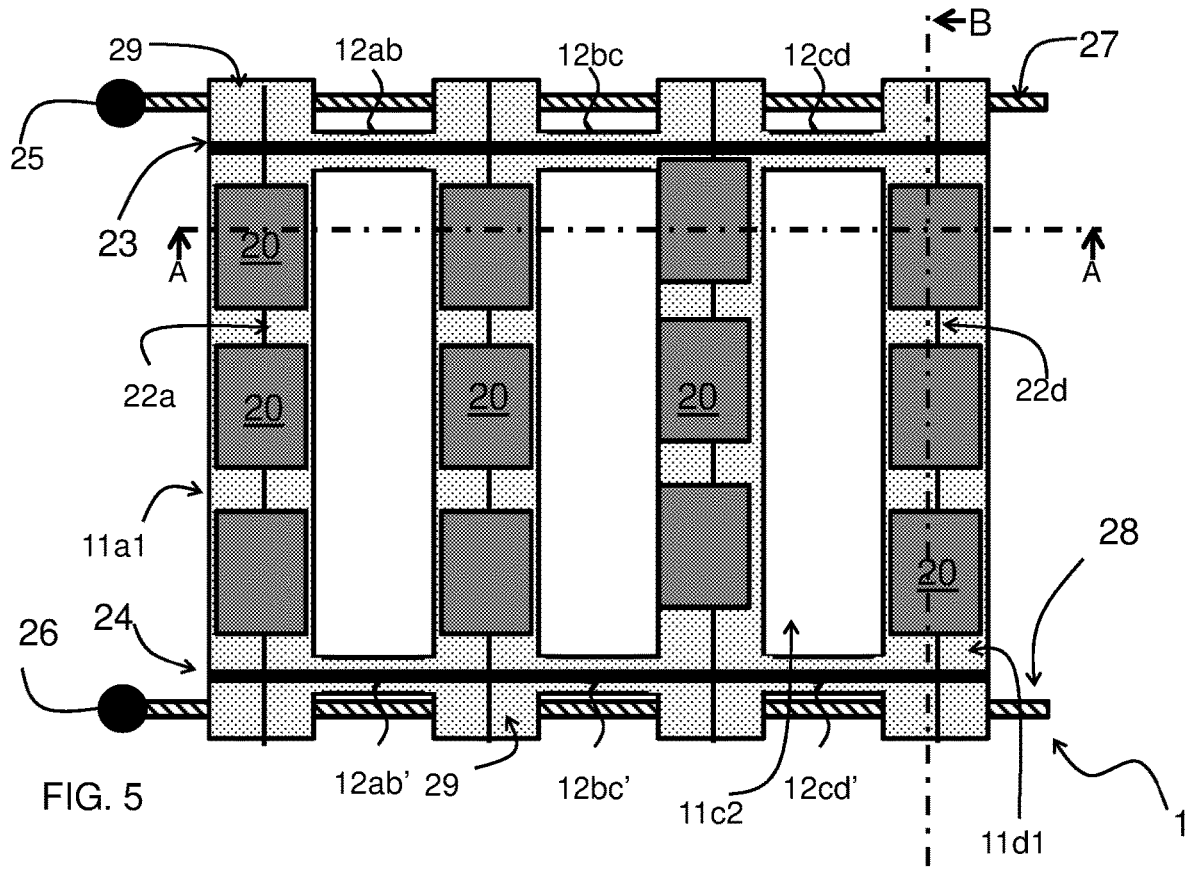
FIG. 5
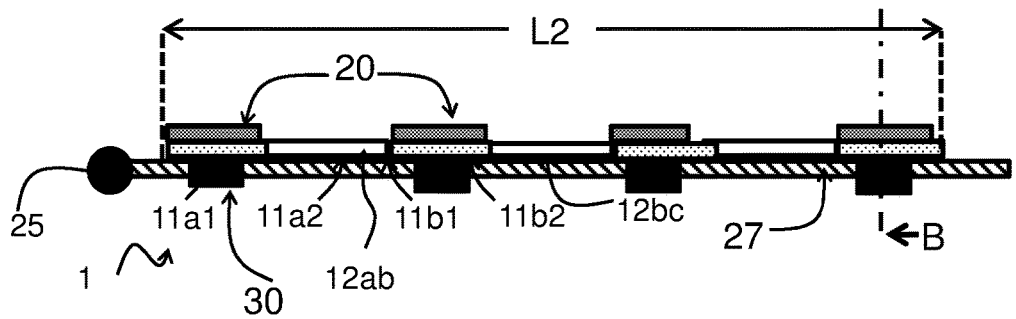
FIG. 5A  Cross-section A-A : extended state
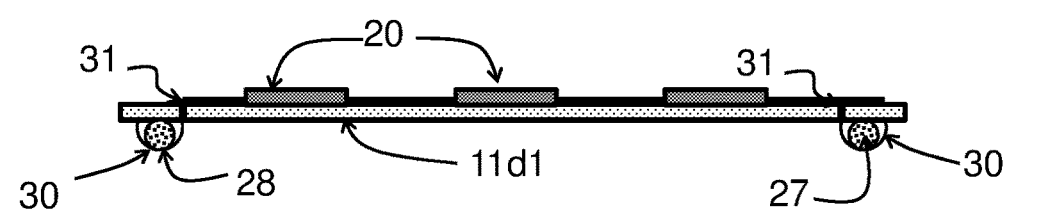
FIG. 5B  Cross-section B-B : extended state

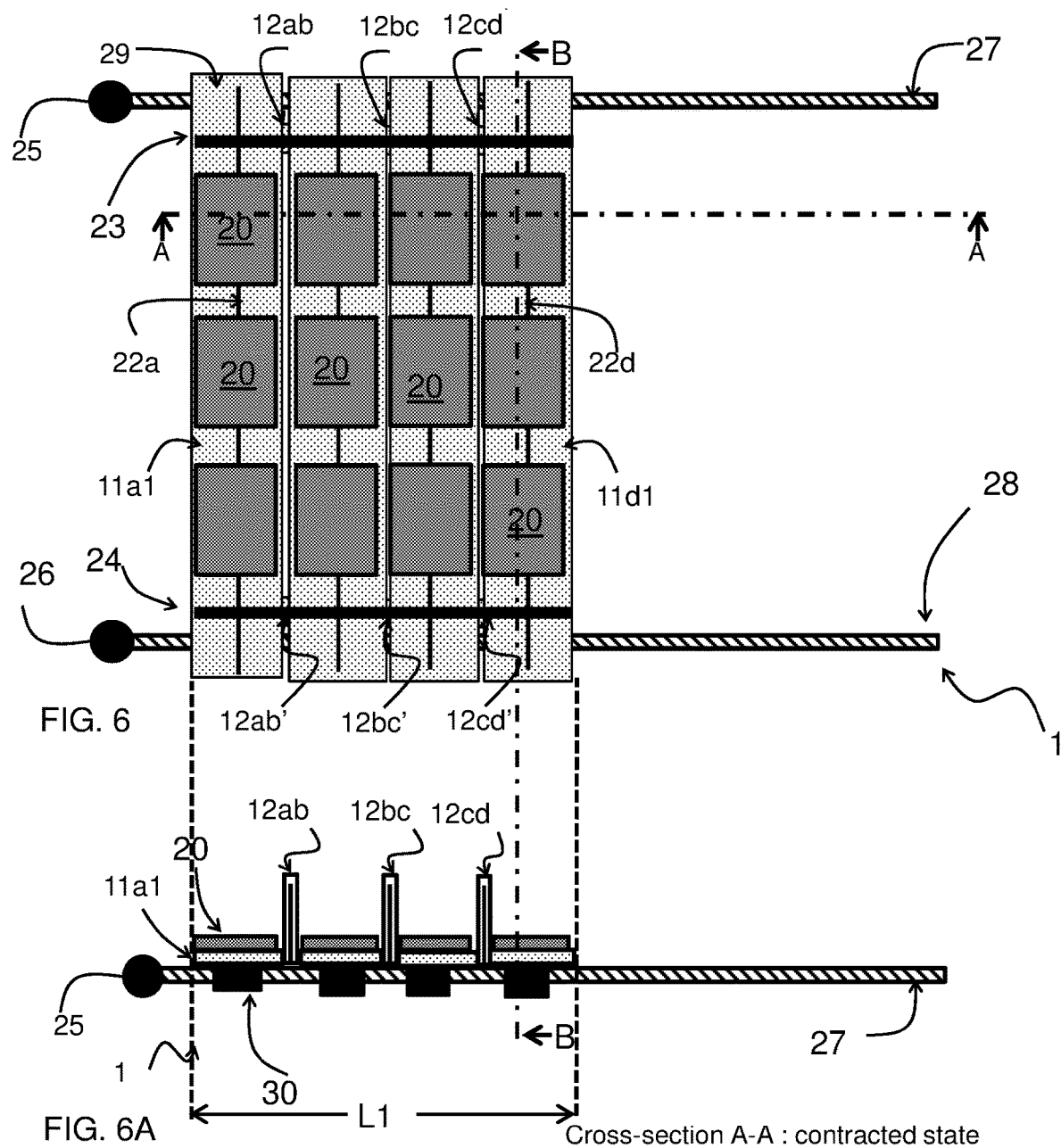
FIG. 6
FIG. 6A  Cross-section A-A : contracted state
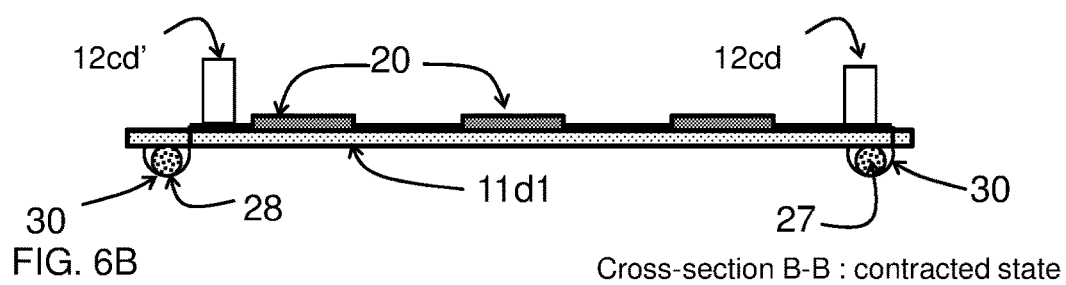
FIG. 6B  Cross-section B-B : contracted state Cross-section A-A : super extended state

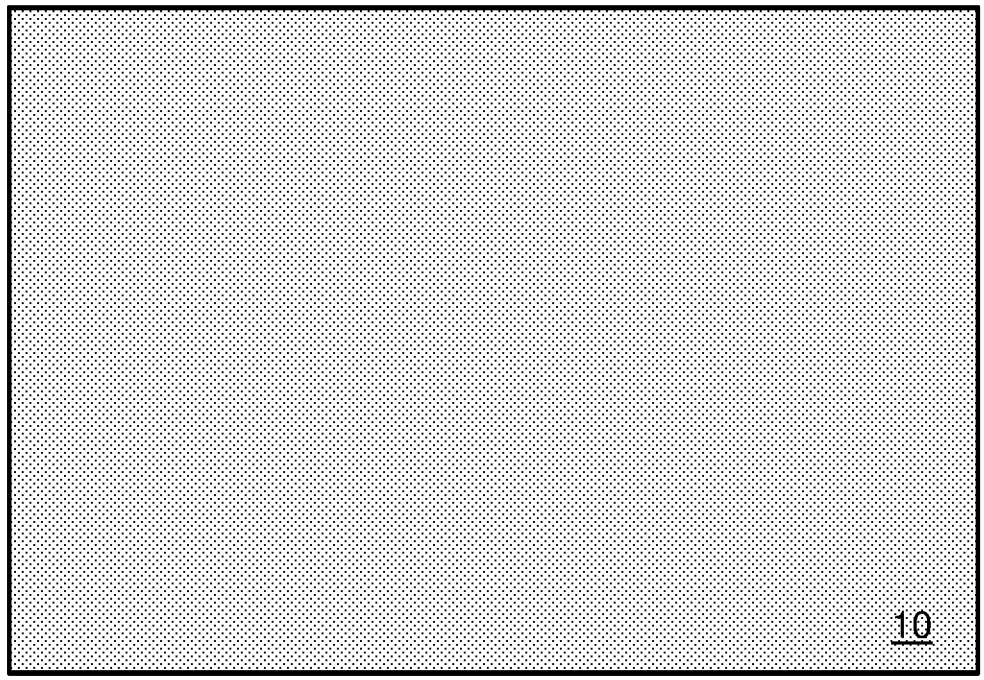
FIG. 9A (S1)
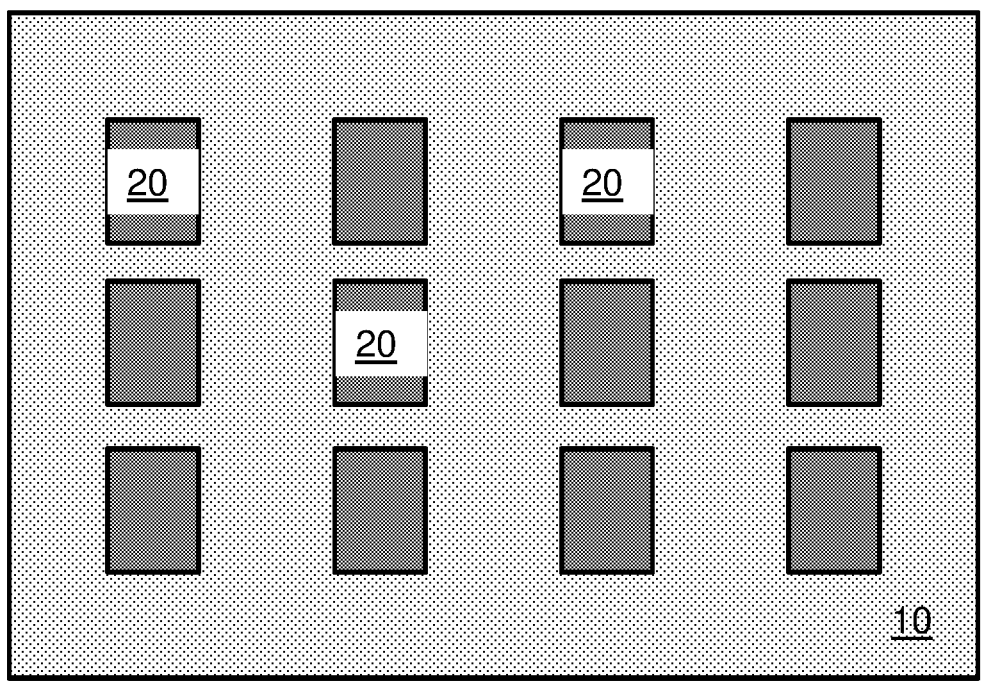
FIG. 9B (S2)

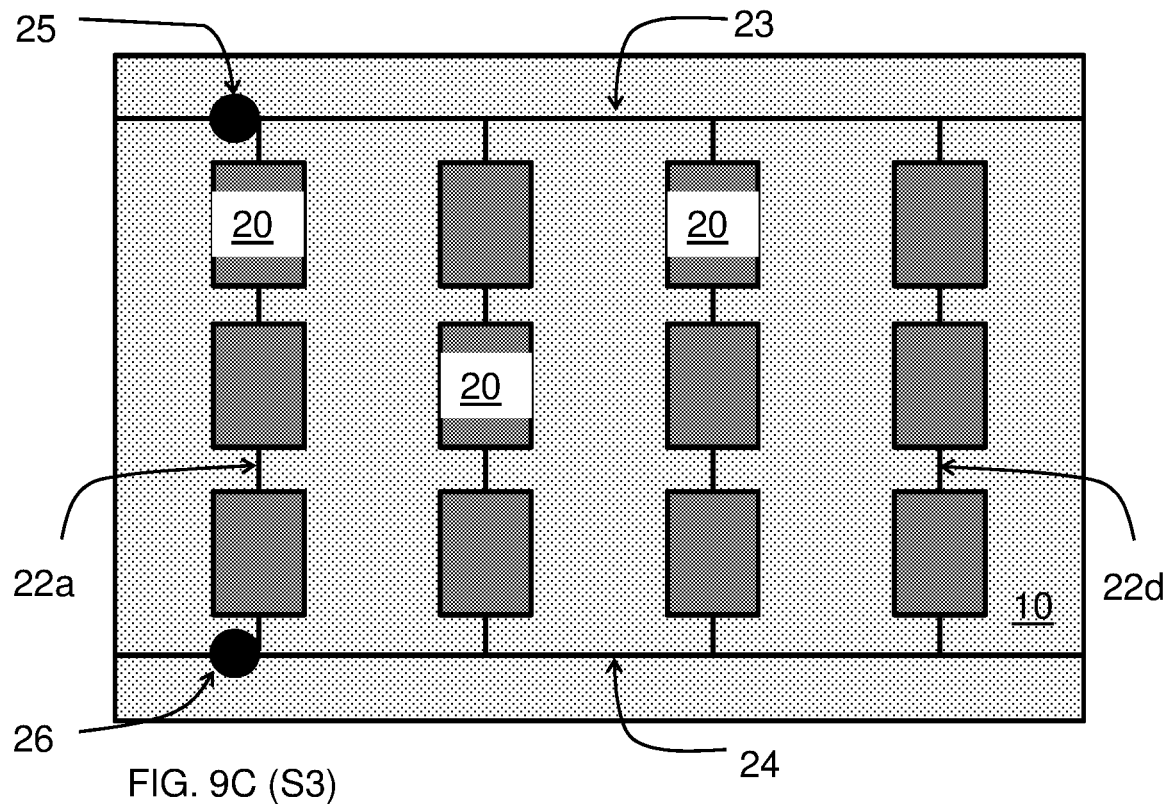
FIG. 9C (S3)
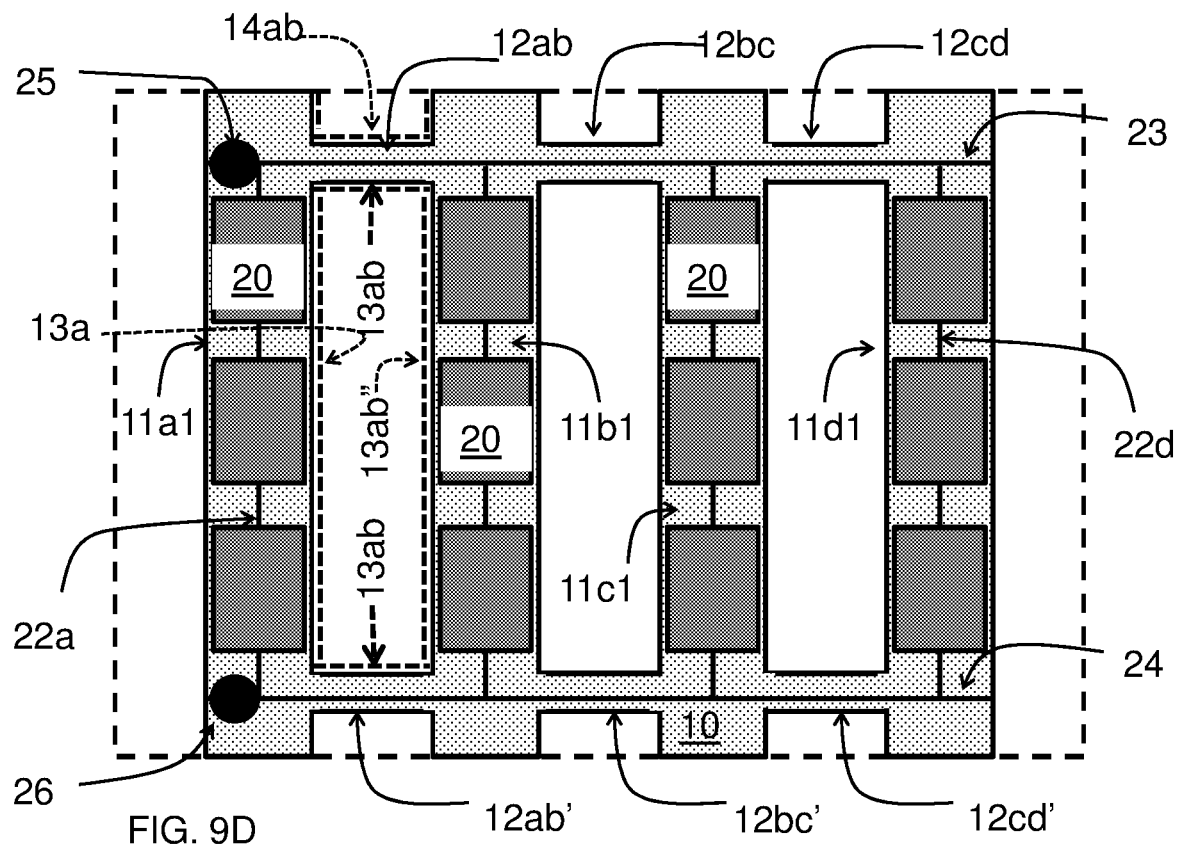
FIG. 9D

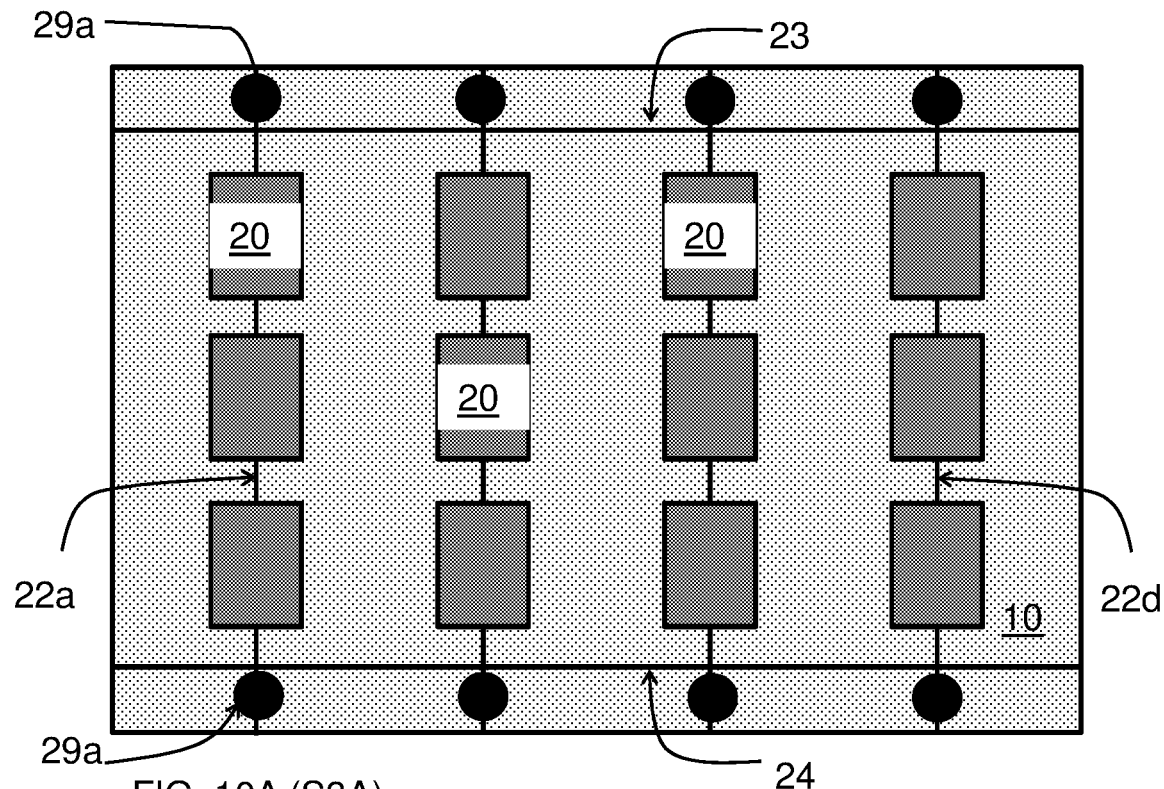
FIG. 10A (S3A)
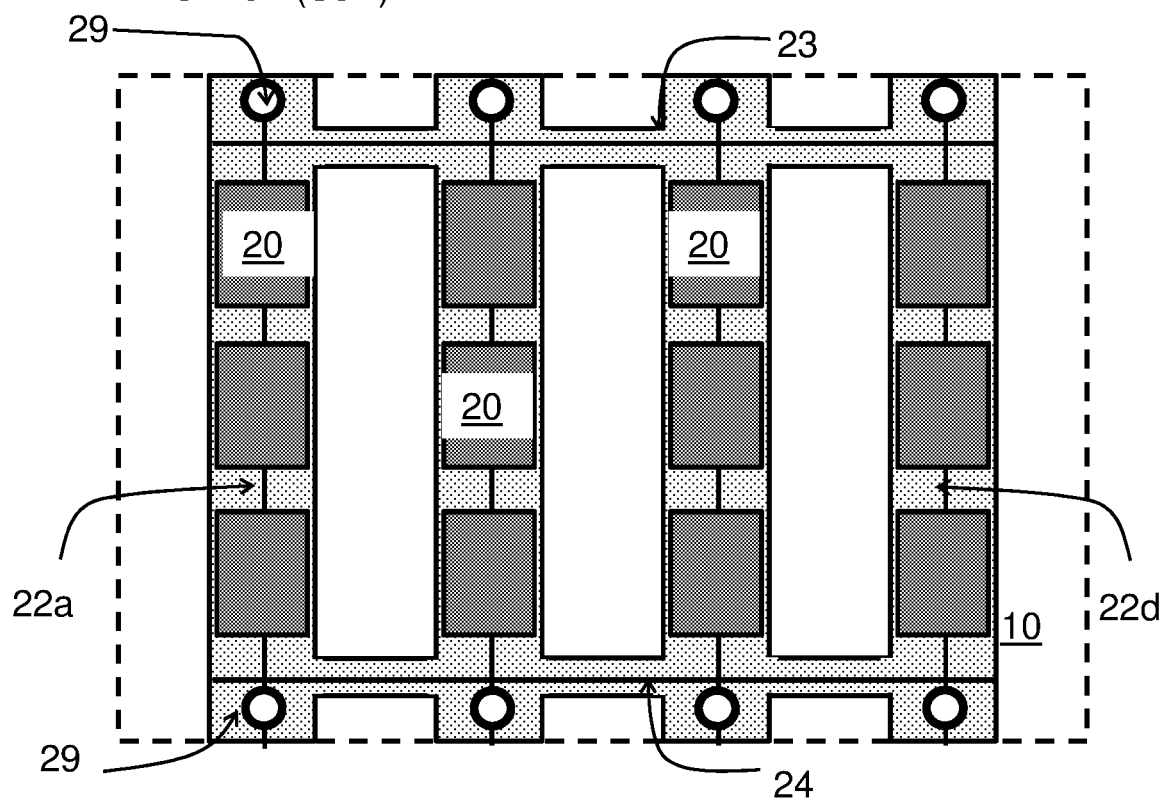
FIG. 10B (S3B)

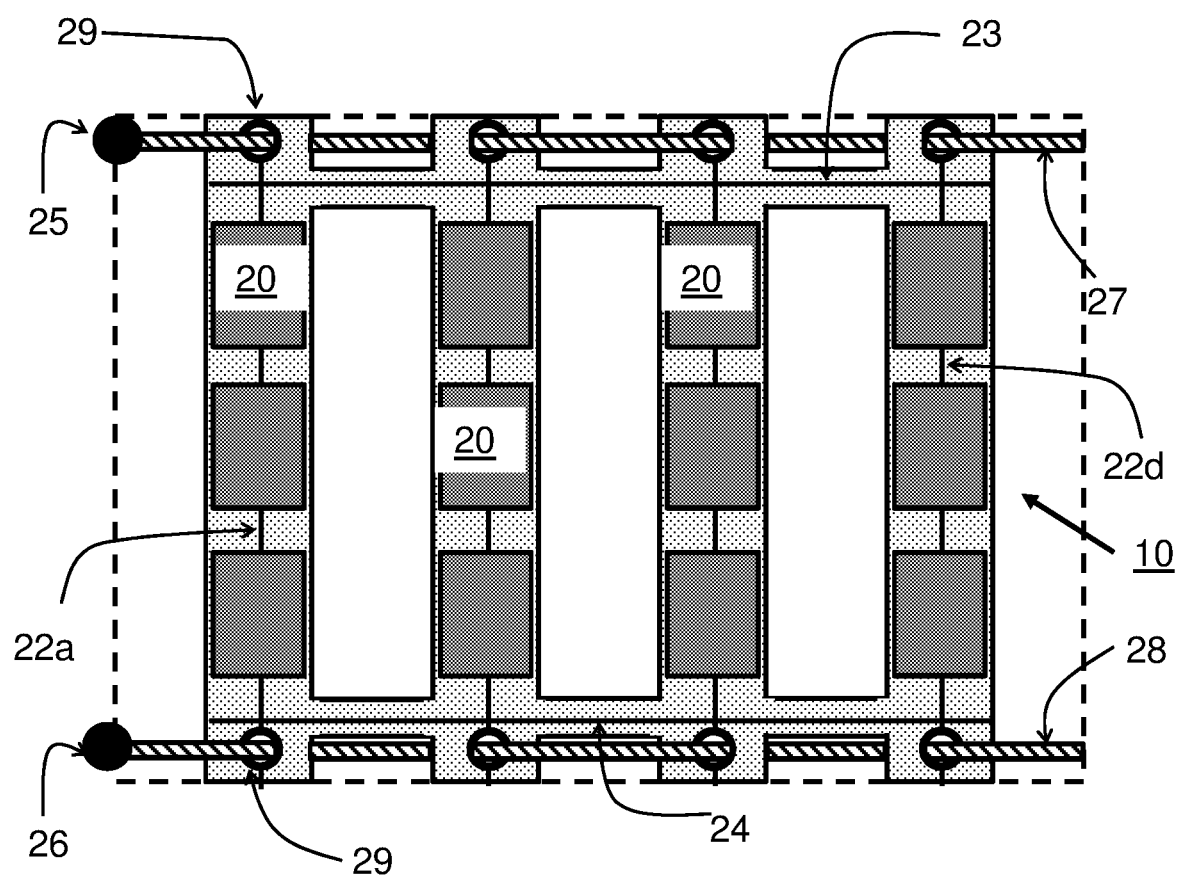
FIG. 10C (S3C)

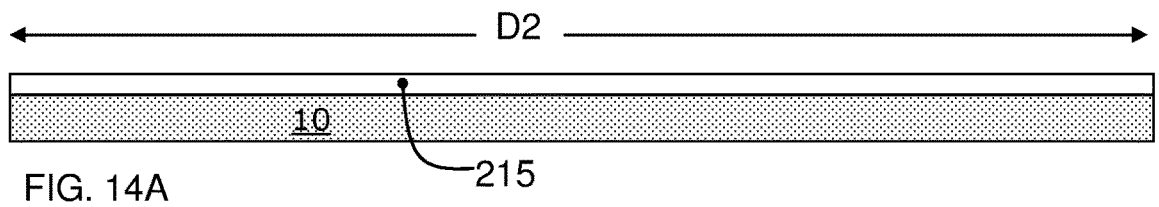
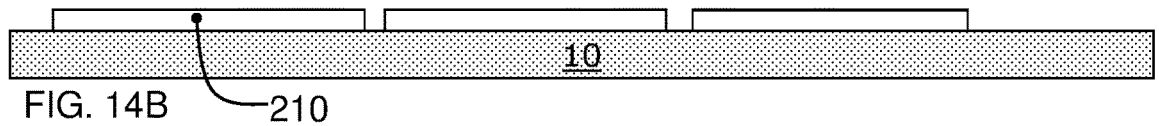
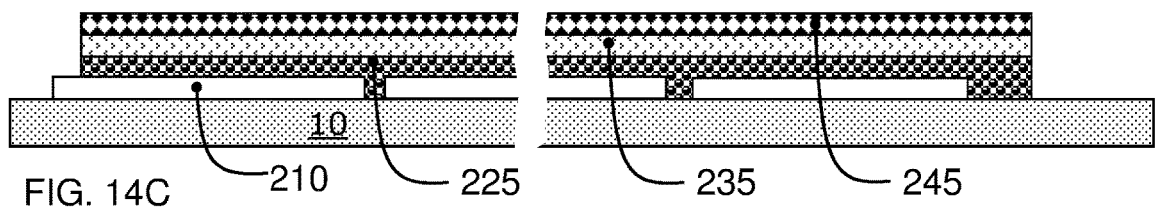
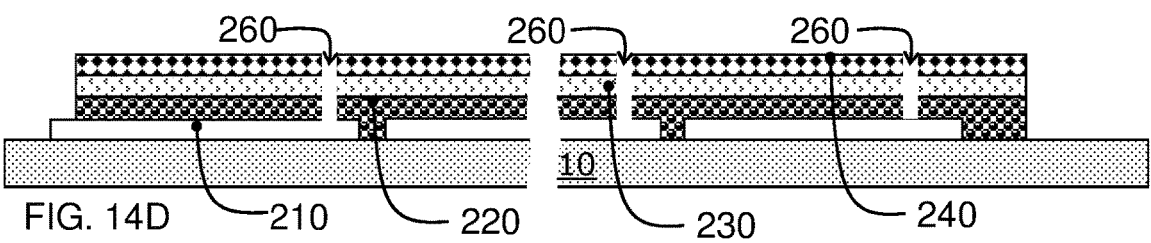
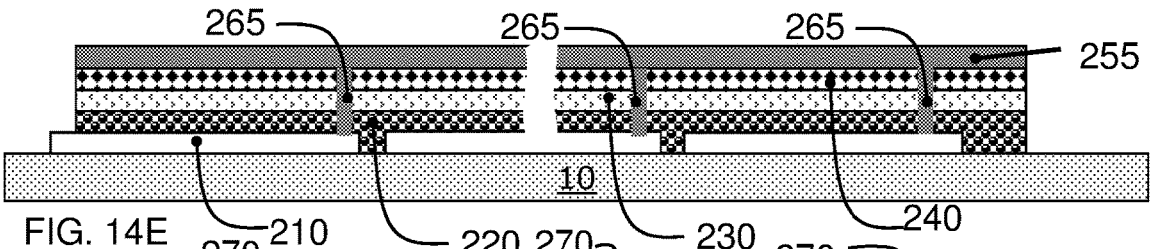
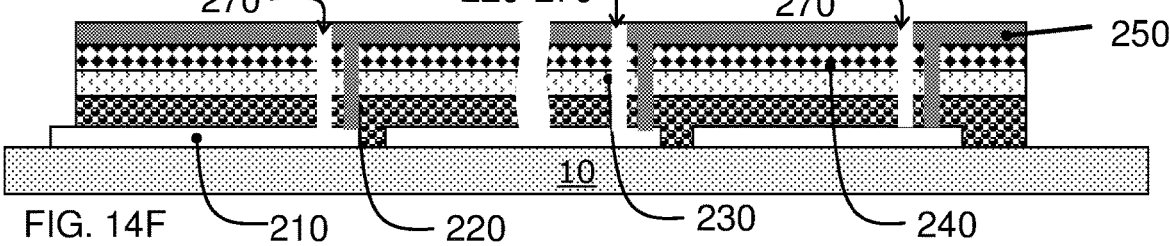
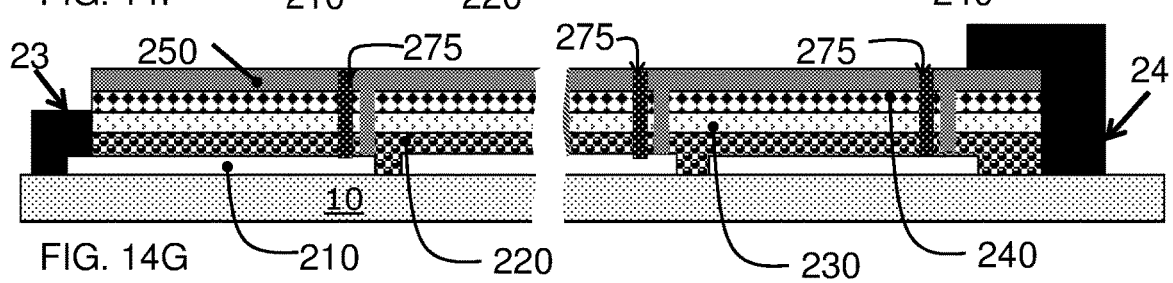

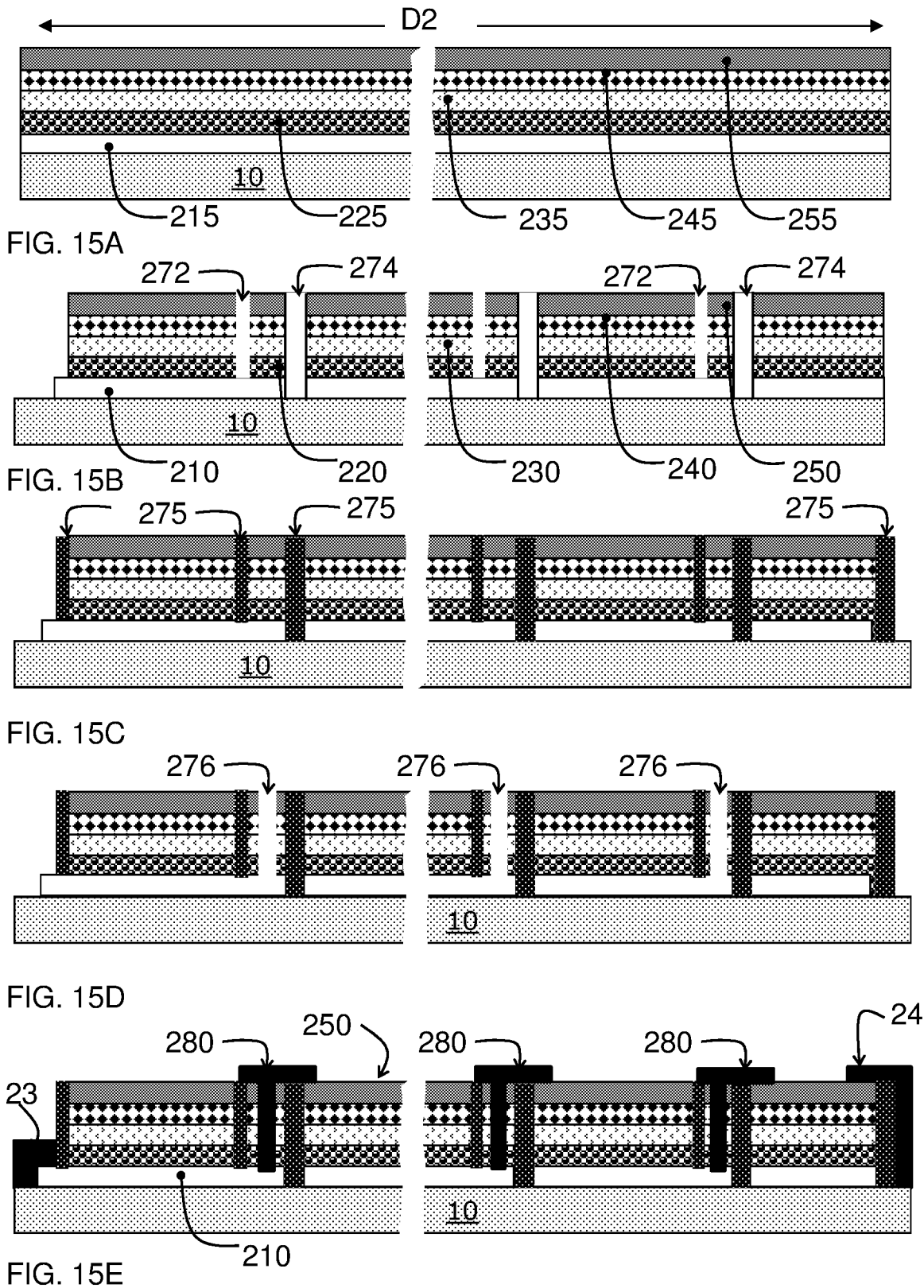

VARIABLE LENGTH SCREEN, SYSTEM COMPRISING THE SAME AND METHOD FOR MANUFACTURING

CROSS-REFERENCE TO RELATED APPLICATIONS

This patent application is a U.S. National Phase of PCT International Application No. PCT/NL2016/050879, filed Dec. 16, 2016, which claims priority to European Application No. 152013843, filed Dec. 18, 2015, which are both expressly incorporated by reference in their entireties, including any references contained therein.

BACKGROUND OF THE INVENTION

Field of the Invention

The present invention relates to a screen having a variable length.

The present invention further relates to a variable length screen system including such a screen.

The present invention still further relates to a method of manufacturing such a screen.

Related Art

US2012061029 discloses a variable screen that includes a generally flat sheet having a front surface, a back surface, and a plurality of elongated slits that extend through the sheet from the front surface to the back surface. The sheet includes a shape memory material that enables the slits to open into openings through which light and fluid can pass when a tensile force is applied to the sheet in a direction generally perpendicular to the slits and further enables the slits and openings to automatically when the tensile force is removed. The screen can be provided with photovoltaic elements to capture light and convert it into electricity.

It is a disadvantage of the known product that a tensile stress has to be applied to create openings. Therewith the photovoltaic elements on the foil are warped. This will generally result in a less efficient capture of solar energy and may damage the photovoltaic elements in time.

SUMMARY OF THE INVENTION

It is an object of the present invention mitigate one or more of these disadvantages. In accordance with this object a variable length screen is provided as claimed in claim 1. Also a variable length screen system is provided as claimed in claim 8.

In the variable length screen of claim 1, the connection portions bridging the slat shaped portions enable the screen to vary its length in a continuous manner between a first, contracted mode, wherein the connection portions are curved, and a second, extended mode, wherein the connection portions are linearized. Therewith the slat shaped portions carrying the photovoltaic elements at last substantially remain in the same plane, therewith avoiding deformations of the photovoltaic elements. In some embodiments the connection portions are stretchable, enabling the screen to assume a super extended mode, providing for openings in the screen and or increasing a size of openings therein.

It is a further object of the present invention to provide an efficient method of manufacturing such a variable length screen. In accordance with this further object a method is provided as claimed in claim 10. The method of claim 10 enables an efficient manufacturing of the product in a roll to roll manner.

BRIEF DESCRIPTION OF THE DRAWINGS

These aspects are set out in more detail with reference to the drawings. Therein:

FIG. 1 shows a top view of a screen 1 that has a variable length L in a first direction D1, FIG. 1A shows a cross-section AA of the variable length screen 1 as it is shown in FIG. 1A, FIG. 1B shows in cross-section according to the same view as that of FIG. 1A, the screen 1 in its contracted state, FIGS. 6, 6A and 6B show the screen of FIGS. 5, 5A and 5B in a contracted state, FIG. 7, 7A-7C show a further embodiment, FIG. 9A-9D illustrate an embodiment of a method of manufacturing a variable length screen according to the present invention, FIG. 10A-10C illustrates optional additional steps for that method, FIG. 11 schematically shows an embodiment of the screen comprising a plurality of segments, FIG. 12 schematically shows an alternative embodiment of the screen comprising a plurality of segments, FIG. 14A-14G, illustrates an alternative implementation of that stage, FIG. 15A-15E, illustrates a further alternative implementation of that stage.

DESCRIPTION OF EMBODIMENTS

In the sequel corresponding parts are indicated by a corresponding reference.

The term "foil" refers to a sheet comprising one or more layers of material. Preferably, the foil is flexible such that it can be used in a roll-to-roll (R2R) or roll to sheet (R2S) manufacturing process. For such purpose, a foil may be considered flexible if it can be rolled or bent over a radius of curvature of 50 cm or less, e.g. 12 cm, without losing its essential functionality, e.g. an electronic functionality. Alternatively, or in conjunction a foil may be considered flexible if it has a flexural rigidity smaller than 500 Pa·m^3.

FIG. 1 shows a top view of a screen 1 that has a variable length L in a first direction D1. The screen comprises a structured foil 10 with a front surface and a back surface and having outer boundaries 14$u$, 14$r$, 14$b$, 14$l$. The structured foil 10 comprises at least a first and a second slat shaped portion 11$a$1+11$a$2, 11$b$1+11$b$2, 11$c$1+11$c$2, 11$d$1+11$d$2 that extend in a second direction D2 transverse to the first direction. The structured foil 10 further comprises at least a first and a second connection portion, e.g. 12*ab*, 12*ab*'. The structured foil 10 is structured by sections, extending from said front surface to said back surface through the foil 10, e.g. the section comprising the section portions 13*ab*, 13*ab*', 13*ab*" between the first and the second slat shaped portion 11*a*1+11*a*2, 11*b*1+11*b*2. The sections leave the at least a first and a second slat shaped portion 11*a*1+11*a*2, 11*b*1+11*b*2 and the at least a first and a second connection portion 12*ab*, 12*ab*' mutually integral. In the embodiment shown the slat shaped portions include a main region, 11*a*1, 11*b*1, 11*c*1, 11*d*1 and an extension region 11*a*2, 11*b*2, 11*c*2, 11*d*2. The extension region, e.g. 11*a*2 is the region of the slat shaped portion that extends within the convex hull of the section 13*ab*, 13*ab*', 13*ab*".

The slat shaped portions 11*a*, 11*bb*, . . . are slidingly coupled with a pair of elongate guidance elements. Therewith the slat shaped portions can slide in the first direction along the guidance elements. In the embodiment shown, the elongate guidance elements are rails 81, 82, and the slat shaped portions 11*a*, 11*bb*, . . . are each slidingly coupled therewith by a pair of sliders 83, 84.

Figure 3:
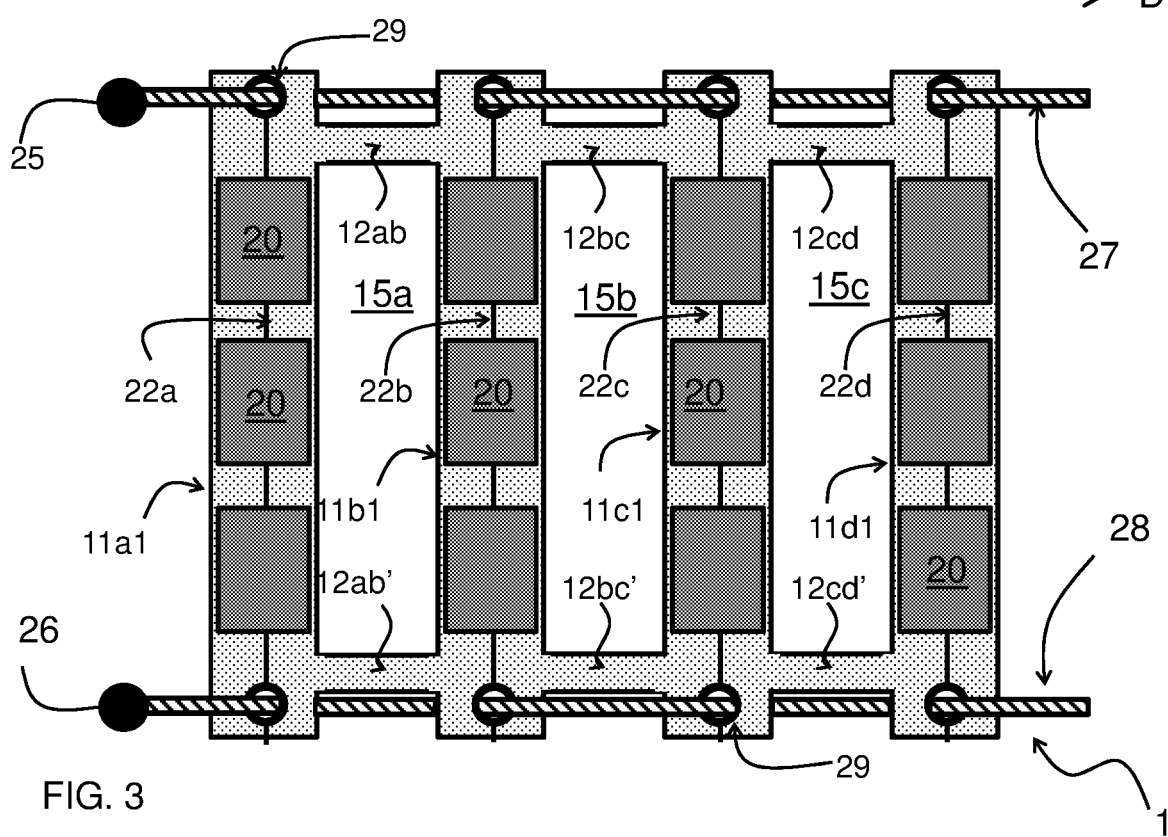
FIG. 3 shows an alternative embodiment of the screen.

In the embodiment of FIG. 3, the elongate guidance elements are a pair of cables 28, 29, and the slat shaped portions are slidingly coupled therewith, in that the cables 28, 29 extend through openings formed by rivets 29. In the embodiment of FIG. 3 the cables 28, 29 are electrically conductive and serve as main connectors connecting the photovoltaic elements 20 to external terminals 25, 26. In addition, the photovoltaic elements 20 are connected to the external terminals 25, 26 by a pair of busbars 23,24 extending along the connection portions 12*ab*, 12*ab*', 12*bc*, 12*bc*'. In other embodiments, only one of these electrical connections may be provided.

The connection portions are configured to flex in a direction transverse to the first and the second direction This allows the slat shaped portions to shift relative to each other in the first direction. Therewith the screen can be reduced in size in the first direction D1, as shown in FIG. 1B for example. Therein it assumes a contracted state.

As can be seen for example in FIG. 1A, the at least a first and a second connection portion 12*ab*, 12*ab*' independently form a bridge between the at least a first and a second slat shaped portion 11*a*1+11*a*2, 11*b*1+11*b*2 at respective positions in said second direction. In particular the connection portion, e.g. 12*ab* extends between a main region 11*a*1 of a slat shaped portion and a main region 11*b*1 of a subsequent slat shaped portion. In the drawings the dotted lines inside the outer boundaries 14*u*, 14*r*, 14*b*, 14*l* of the foil 10 indicate structuring of the foil 10 into (main and extension region of) slat shaped portions 11*a*1+11*a*2, 11*b*1+11*b*2, 11*c*1+11*c*2, 11*d*1+11*d*2 and connection portions 12*ab*, 12*ab*'. In some instances these dotted lines are extrapolated outside the boundaries of the foil 10 to indicate measures and the like.

The at least a first and a second connection portion 12*ab*, 12*ab*', each have a respective pair of edges extending in the first direction D1 over a distance D from the at least a first slat shaped portion 11*a* to the at least a second slat shaped portion (11*b*). The distance D, shown in FIG. 1 is defined by the begin and end of the section 13*ab* (and similarly by the begin and end of the section 13*ab*').

In order to reduce a curvature of the slat-shaped portion in the contracted state, the total width of the connection portions is preferably less than a fifth of the total width of the slat shaped portions. In the embodiment shown, the total width of the connection portions is the sum of the width W of the two connection portions i.e. being 2W. The slat shaped portions in this case extend over the full width of the product. In this case the relative total width, i.e. the total width of the connection portions relative to the width of the slat shaped portions in the direction D2 is about $1/10^{th}$. Preferably the relative total width is not less than about $1/100^{th}$. A substantially smaller relative total width, e.g. less than $1/1000^{th}$ would incur the risk of a reduced mechanical strength.

The relative length of the connection portions, i.e. their length D divided by the thickness of the foil used is preferably in the range of 50 to 200. I.e. if the relative length is substantially less than 50, e.g. less than 10, the connection portions will be relatively inflexible and make it difficult to optimally contract the screen. If the relative length is substantially greater than 200, e.g. greater than 1000, the connection portions will have an arbitrary shape, involving the risk that they stick behind other parts of the product and get damaged.

As shown in FIG. 1, the sections that structure the foil 10 include a central section portion 13*ab*", that generally extends in the second direction D2, and end section portions 13*ab*, 13*ab*' at both ends of the central section portion 13*ab*, that generally extend in the first direction D1. In the embodiment shown, the connection portions are bounded laterally by an outer boundary of the foil and an end portion of a section. E.g. connection portion 12*ab* is laterally bounded by section end portion 13*ab* and outer boundary 14*u*. Connection portion 12*ab*' is laterally bounded by portions 13*ab*' and outer boundary 14*b*. The longitudinal ends of the connection portions are determined by the ends of the end portions of the sections. E.g. in the embodiment shown, the longitudinal ends of connection portion 12*ab* are determined by the ends of section portion 13*ab*. The longitudinal ends of connection portion 12*ab*' are determined by the ends of section portion 13*ab*'.

In the first direction D1 the slat shaped portions 11*a*1+11*b*2, 11*b*1+11*b*2, 11*c*1+11*c*2, 11*d*1+11*d*2, are partly disconnected from each other over a distance by the central section portions 13*ab*', . . . . In the embodiment shown in FIG. 1, the extension regions e.g. extension region 11*a*2 extends from the main region 11*a*1, to the boundary defined by the section, e.g. 13*ab*, 13*ab*', 13*ab*". Photovoltaic elements 20 are arranged on the slat shaped portions and substantially cover the slate shaped portions as shown for slat shaped portion 11*a*1+11*a*2. Alternatively, the photovoltaic elements 20 may only partially cover the slat shaped portions, for example as shown by the dashed regions on the extension region 11*b*1 or as shown by the dashed regions on the main region 11*d*1. Also other arrangements are possible as indicated by the dashed regions shown on slat shaped portion 11*c*1, 11*c*2.

The extent to which the photovoltaic elements 20 cover the slat shaped portions are covered can be determined depending on the climate wherein the product is used and the particular application of the screen, e.g. the type of crop cultivated in a greenhouse comprising the screen.

In an embodiment the photovoltaic elements 20 may be partially translucent, e.g. so as to transmit solar radiation in (a) wavelength range(s) that is particular relevant for a crop raised in the greenhouse and to absorb and convert solar radiation having a wavelength outside this/these range(s). Alternatively the photovoltaic elements may have another transmission characteristic, so as to give the impression of daylight although of a moderated intensity, e.g. by a substantially uniform transmission characteristic, or by a transmission characteristic that allows for a balanced transmission of portions of the solar radiation spectrum that gives an impression of daylight.

Alternatively the latter can also be achieved by providing fully opaque photovoltaic elements 20 that partially cover the screen.

FIG. 1A shows a cross-section AA of the variable length screen 1 as it is shown in FIG. 1A. In FIG. 1 and FIG. 1A the screen 1 is shown in an extended state. In this state the connection portions 12ab, 12ab', 12bc, 12bc' etc extend in the plane defined by the directions D1, D2.

FIG. 1B shows in cross-section according to the same view as that of FIG. 1A, the screen 1 in its contracted state. In this state the slat shaped portions are subsequently alternately rotated clockwise and anticlockwise along an axis parallel to the second direction D2, and the connection portions 12ab, 12ab', 12bc, 12bc' etc are curved.

Depending for example on external conditions the screen may be extended as shown in FIG. 1, 1A, contracted as shown in FIG. 1B. Also the screen may be partially contracted, for example by partially curving the connection portions or by only curving a subset of the connection portions.

Figure 2:
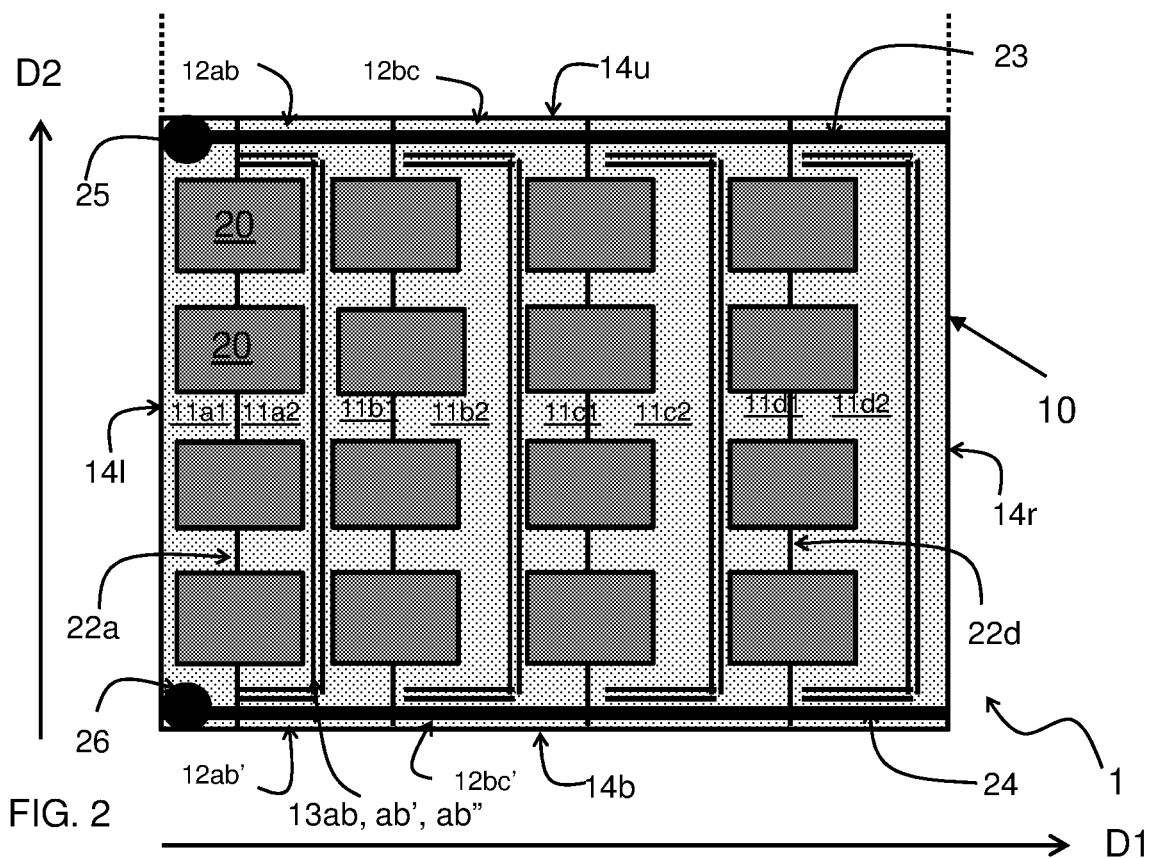
FIG. 2 shows an embodiment of the screen.

FIG. 2 shows an embodiment of the screen. Therein the slat shaped portions 11a1, 11a2, 11b1, 11b2 etc comprise a respective electric connection 22a, . . . , 22d, along which its photovoltaic elements 20 are arranged in series. These electric connections on their turn are electrically connected at their ends with a pair of busbars 23,24 that extends along the connection portions 12ab, 12ab', 12bc, 12bc'. The busbars 23,24 on their turn end in a respective electric terminal 25, 26. It is noted that the photovoltaic elements 20 are not necessarily connected in series. Alternatively they may be connected in parallel, or being arranged as groups of serially connected subgroups that comprise photovoltaic elements 20 arranged in parallel, or as groups of parallel connected subgroups that comprise photovoltaic elements 20 arranged in series. A suitable one of these arrangements may be selected that best meets the desired characteristics of the screen, such as a desired delivery voltage, a desired robustness and the like. It is also noted that fuses and control elements may be included for optimizing efficiency, for example by shunting shadowed photovoltaic elements 20.

In FIG. 2, the elongate guidance elements are not shown. The elongate guidance elements in this case need not be electrically conductive, as already busbars are provided, and may be provided for example in the form of rails, as in FIG. 1, or as rails, e.g. as shown in FIG. 3.

FIG. 3 shows an alternative embodiment of the screen 1. Therein the photovoltaic elements 20 are connectable to external terminals 25, 26 by a pair of elongated electrically conductive guidance elements 27, 28 carrying the structured foil. In the embodiment shown the elements 27, 28 extend through metal rivets 29 in the foil which are electrically connected to the electric connection 22a, . . . , 22d. The pair of elongated electrically conductive guidance elements 27, 28 may be provided in the form of cables or otherwise. In the embodiment of FIG. 3 the elements 27, 28 are provided as electrically conductive strips. In the embodiment shown in FIG. 3, the slat shaped portions only include main regions 11a1, 11b1, 11c1, 11d1, leaving openings 15a, 15b, 15c instead.

Figure 4:
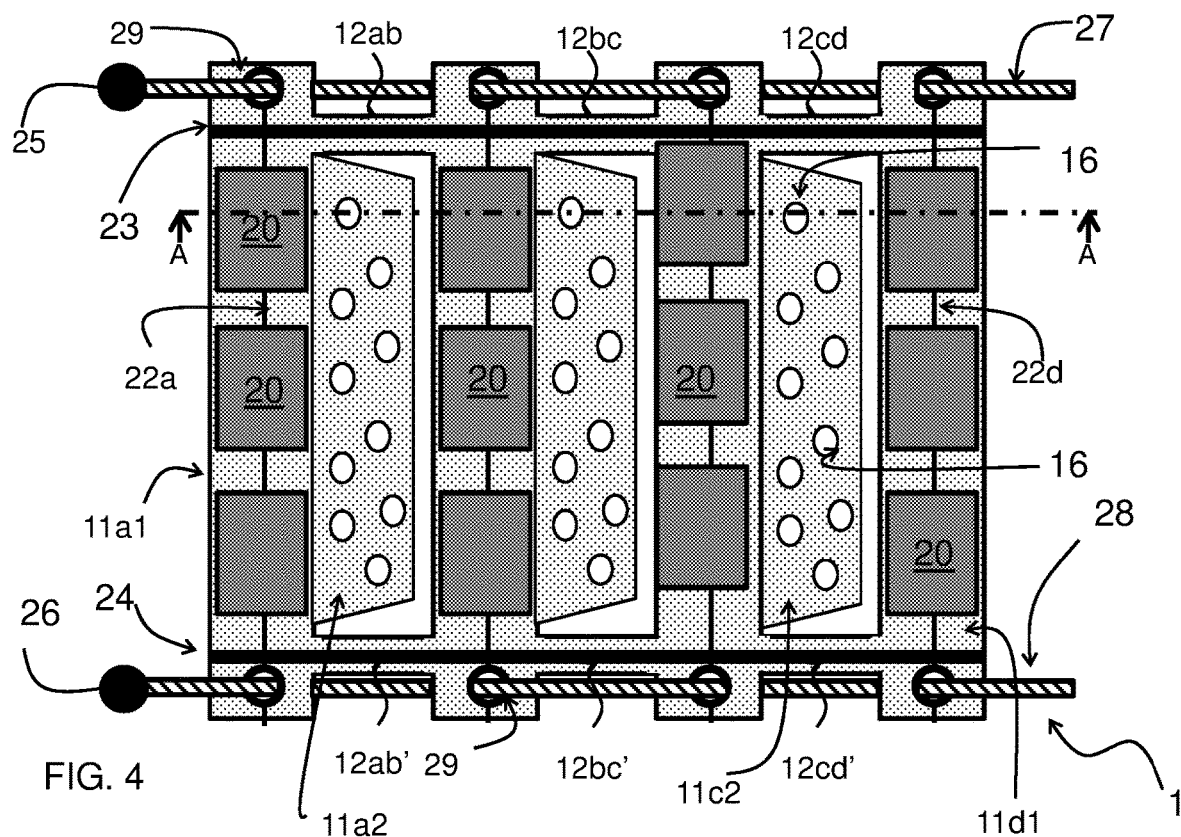
FIG. 4 shows still another embodiment.

FIG. 4 shows still another embodiment. Therein the electric connections 22a, . . . 22d on the main region 11a1, . . . , 11d1 of the slat shaped portions are electrically connected at their ends to a pair of busbars 23,24 that extends along the connection portions 12ab, 12ab', 12bc, 12bc'. The electric connections 22a, . . . , 22d are additionally electrically connected to the electrically conductive rivets 29, which in turn provide for an electrical connection with the a pair of elongated electrically conductive guidance elements 27, 28 carrying the structured foil. This embodiment is advantageous in that a very reliable electrical connection is provided between the photovoltaic elements 20 and the electric terminals 25, 26. In case of failure of the electric connection between a rivet 29 and an elongated electrically conductive guidance element, e.g. 27, an alternative current path is still provided via a busbar, e.g. 23 to another rivet that can provide for an electric connections with that elongated electrically conductive guidance element 27. Nevertheless, on average the current load of the busbars can be relatively low, as the elongated electrically conductive guidance elements 27, 28 can serve as a main conductor. In the embodiment of FIG. 4, the slat shaped portions include extension regions, e.g. 11a2, 11c2. In the embodiment shown here they are provided with perforations 16. It will be appreciated that such perforated extension regions can also be applied in the embodiments shown in the previous Figures. Alternatively the embodiment shown in FIG. 4 may have the continuous, non perforated extension regions of FIG. 1, for example with photovoltaic elements arranged thereon or extension regions may be absent or have a more limited width. A proper choice between such options may be based on the application wherein the screen is used and other circumstances, such as a the climate.

Figure 4A:
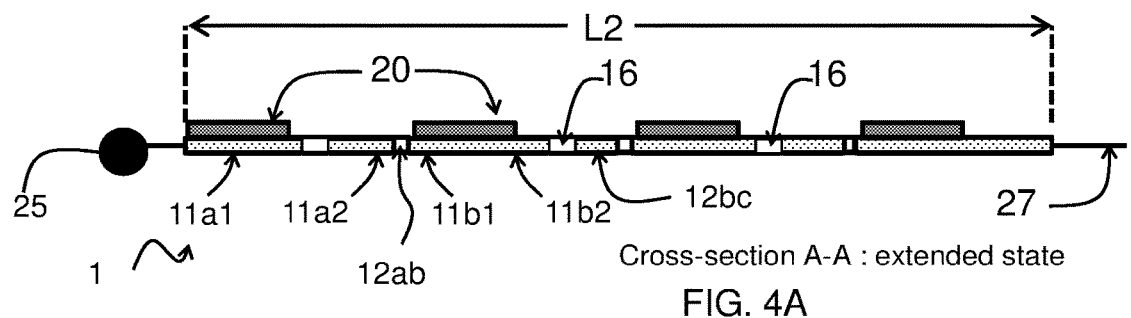
FIG. 4A illustrates the screen of FIG. 4 in a cross section according to A-A in FIG. 4.
Figure 4B:
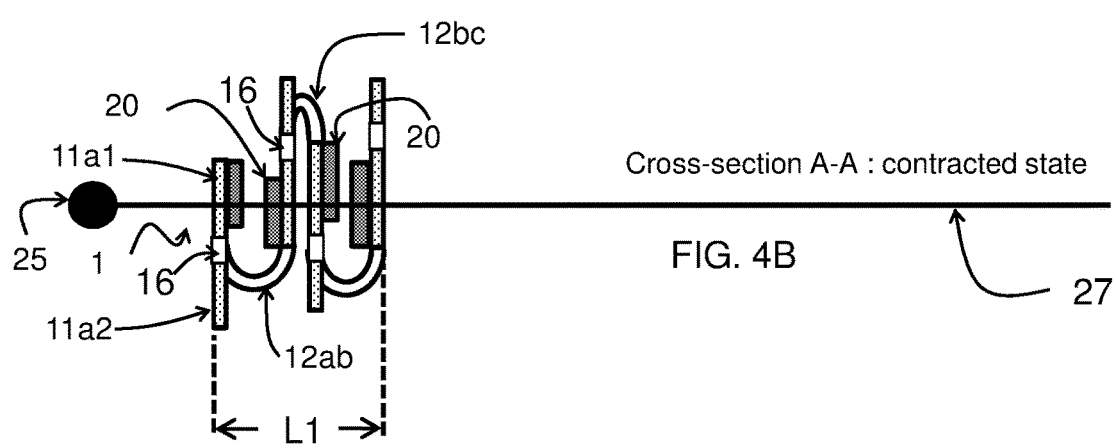
FIG. 4B shows the screen of FIG. 4 in its contracted state from the same point of view of FIG. 4A, FIGS. 5, 5A and 5B show a further embodiment in an extended state.

FIGS. 2, 3 and 4 illustrates the screen in an extended state. FIG. 4A illustrates the screen of FIG. 4 in a cross section according to A-A in FIG. 4. FIG. 4B shows the screen of FIG. 4 in its contracted state from the same point of view of FIG. 4A.

FIGS. 5, 5A and 5B show a further embodiment in an extended state. The embodiment is comparable to the embodiment of FIG. 3 and the embodiment of FIG. 4, 4A, 4B, in that a very reliable electrical connection is provided between the photovoltaic elements 20 and external terminals 25, 26 by a pair of elongated electrically conductive guidance elements 27, 28, here cables, e.g. stainless steel cables, carrying the structured foil. The embodiment is further comparable to the embodiment of FIG. 4, 4A, 4B, in that additionally a pair of busbars 23,24 is provided that extend along the connection portions 12ab, 12ab', 12bc, 12bc'. Contrary to these previous embodiments the mechanical and electrical coupling between the pair of elongated electrically conductive guidance elements 27, 28 and the structured foil is not provided by rivets in the foil, but by cylindrical sliding elements 30 surrounding the cables 27, 28 that are electrically connected to the electric connections of the photovoltaic elements 20 by a respective feedthrough element. It is noted that it is not necessary that the elongated guidance elements 27, 28 serve as electrical conductors as the pair of busbars 23, 24 already provide for an electrical connection in this embodiment.

FIGS. 6, 6A and 6B show the screen of FIGS. 5, 5A and 5B in a contracted state. In the contracted state, the connection portions 12ab, 12ab', 12bc, 12bc' etc, curve out of the plane defined by directions D1, D2, enabling the slat shaped portions to shift to one side in the first direction, therewith providing access to solar radiation at the opposite side.

Figure 7A:
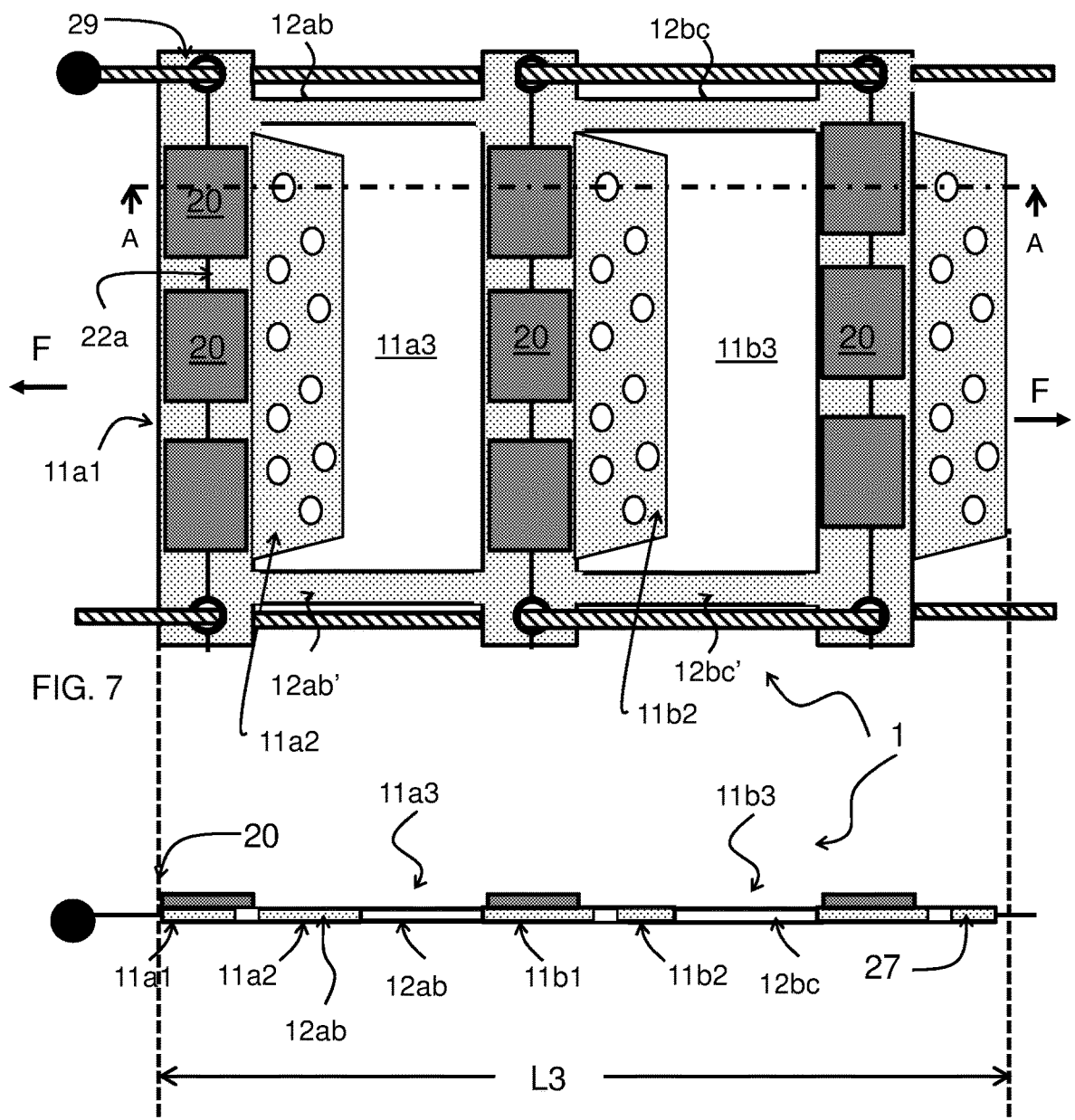
Figure 7B:
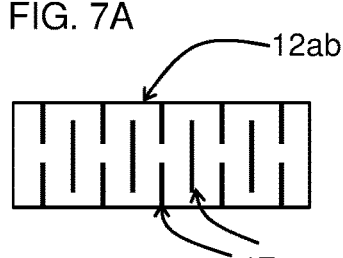
Figure 7C:
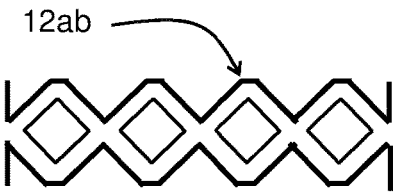

FIG. 7A-7C show a further embodiment. This embodiment differs from the embodiment shown in FIG. 4, 4A, 4B, in that the first and second connection portion 12ab, 12ab', 12bc, 12bc' are elastic. For example, these portions may be stretched elastically in a non-destructive manner to for example 1.5 times their original length or even to 2 times their original length. This may for example be achieved in that the foil used for manufacturing the screen is of an elastic material. Due to the relatively small width of the connection portions as compared to the slat shaped portions, when exerting a pulling force on the screen in the first direction, this will cause the connection portions to stretch, whereas the shape of the slat shaped portions remains substantially the same. Therewith the screen assumes a super-stretched state as illustrated in FIG. 7, 7A. In the absence of the pulling force the screen resumes a normally stretched state as shown in FIG. 4, 4A, for example. Likewise, it can be contracted as shown in FIG. 4B for example. In the embodiment shown in FIG. 7, 7A, the screen does not have busbars as in the embodiment of FIG. 4, 4A, 4B for example. Such busbars may for example be included in the embodiment shown in FIG. 7, 7A in the form of stretchable electrically conductive organic materials, or as meandering lines for example from a metal.

Instead of (or in addition to) using an elastic material for the connection portions in order to enable the screen to assume a super extended state, the connection portions may alternatively have a meandering shape in the (normally) extended state of the screen.

An example is shown in FIG. 7B, wherein a connection portions 12ab is provided with intersections 17 extending at least substantially in the second direction D2, i.e. transverse to the direction D1 in which the screen should be stretchable.

Figure 8:
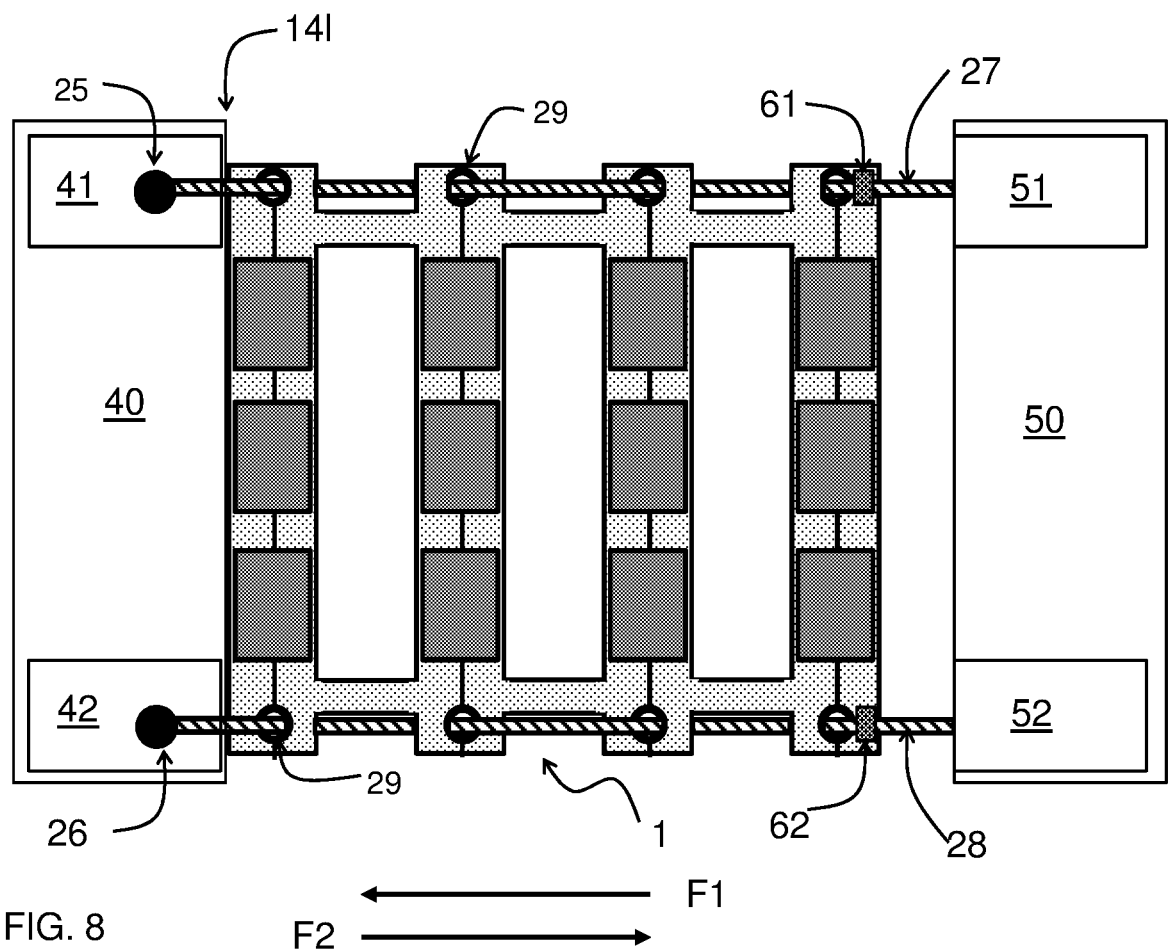
FIG. 8 illustrates an embodiment of a variable screen system.

As shown in FIG. 8, embodiments of the screen 1 as described above may be part of a variable length screen system that in addition includes an actuator device 40. The actuator device 40 is provided for exerting a force F1 on the screen according to said first direction to change a configuration of said the screen from an extended state (as shown in FIG. 8) to a contracted state. To that end the actuator device 40 comprises actuators 41, 42, that exert a pulling force F1 on the guidance elements 27, 28, which on their turn exert this force to the screen 1, by mounting elements 61, 62, with which they are fixed to the screen. In the embodiment shown a further actuator device 50 is provided with actuators 51, 52 is that is capable to provide a pulling force F2 in the opposite direction. As the screen is fixed on its left side 14l, this has the effect of changing the configuration of the screen from a contracted state to an extended state. In certain embodiments (as shown in FIG. 8) the further actuator device 50 may further be configured to exert the force in the opposite direction to change a configuration of the screen from an extended state to a super extended state. The further actuator device 50 may for example maintain the screen in a super extended state at a desired length by maintaining the force F2. As an alternative, one of the actuator devices 50, 60 may be replaced by passive (non-controllable) force exerting means, such as a spring. Also gravity may be employed as a passive force exerting means.

FIG. 9A-9D illustrate an embodiment of a method of manufacturing a variable screen according to the invention. As shown in FIG. 9A, the method comprises a step S1 wherein a foil 10 of a flexible material and having a front surface and a back surface is provided. Depending on the particular application the foil may have a thickness of a few micron to a few mm. For example the thickness is in the range of 100 micron to 2 mm. The width is for example in a range of 0.1 to 5 m, and the length is for example in a range of a few meters to a few kilometers. The length typically defines a first direction D1 and the width typically defines a second direction D2. The material used for the foil may be a polymer, such as PEN, PET, PE, but alternatively a metal foil may be employed. Also a laminate comprising a plurality of layers, e.g. a combination of metal and polymer layers is suitable. In a step S2, shown in FIG. 9B, the foil 10 is provided with a plurality of photovoltaic elements 20 by deposition of at least a first electrode layer, a photovoltaic layer and a second electrode layer on the foil. The deposition processes may be implemented in a roll to roll process. In step S3, as shown in FIG. 9C, the foil is provided with electric conductors 22a, . . . , 22d, 23, 24 that enable a connection of the photovoltaic elements 20 to external terminals for supply of electric energy generated by the photovoltaic elements 20. In the embodiment shown, the electric conductors include a series connection 22a, . . . , 22d for serially connecting individual photovoltaic elements in respective subsets, and busbars 23, 24 for connecting these subsets in parallel to external terminals 25, 26. It is noted that steps S2 and S3 need not necessary be performed in the order shown here. For example some electrical connections may be provided before deposition of the layers of the photovoltaic elements, or may be deposited between two subsequent steps of deposition of these layers. It is further noted that additional layers may be deposited, for example for protection against moisture and mechanical factors.

Ideally, for PV integrated greenhouse screens, a R2R production should be envisaged to allow for a cost effective end-product. In order to enable realization of this PV integrated screen product, perpendicular to the web direction, striped PV elements (200, see FIG. 13A) are preferred that have a width in the first direction D1 in the ranged between 2 and 20 mm. The spacing between these PV elements in the first direction D1 can be between 2 and 100 mm, depending on the final desired shading and air ventilation required for the developed greenhouse screen. These striped PV elements are preferable configured as respective strings of serially arranged modules, in order to limit the current in per string and to increase the output voltage and to limit the current to the main connectors, e.g. the busbars, for optimal harvesting purposes. As a consequence, PV cell interconnections need to be realized in the second direction D2, perpendicular to the first direction, D1 and therewith perpendicular to the direction in which the web is transported during roll to roll manufacturing. Suitable methods are described in more detail with reference to FIG. 13 to FIG. 16.

As shown in FIG. 9D, in a fourth step S4, the foil 10 is sectioned into at least a first and a second slat shaped portion 11a1, 11b1, 11c1, 11d1 and connection portions 12ab, 12ab', 12bc, 12bc', 12cd, 12cd'. The slat shaped portions extend in the second direction D2 transverse to the first direction D1.

In step S4, the foil is structured by sections 13ab, 13ab', 13ab" extending from said front surface to said back surface through the foil. These leave the slat shaped portions 11a1, 11b1 and the connection portion mutually integral. In particular integrity is maintained in that the connection portions independently bridge mutually subsequent slat shaped portion, e.g. 11a1 and 11b1 at respective positions the said second direction. In addition the sectioning includes a section 13a, which removes a part of the slat shaped portions, so as to leave an opening for transmission of light or allowing for ventilation. The foil is sectioned in such a manner that the photovoltaic elements 20 are arranged on the slat shaped portion. It could be contemplated to also arrange photovoltaic elements on the connection portions, but these portions are folded when bringing the screen in its contracted state. Therewith the photovoltaic elements in these positions would be more vulnerable to mechanical damage. The connection portions 12ab, 12ab' have a respective pair of edges extending in the first direction over a distance (D) from a slat shaped portion, e.g. 11a1 to the subsequent slat shaped portion, e.g. 11b1. One edge is formed by the section portion, e.g. 13ab. The other edge may be formed by the original edge of the foil, but alternatively, as shown here, by another section 14ab.

FIGS. 10A, and 10B illustrate steps S3A, S3B, wherein slidable contact elements are provided as additional electrically conductive elements forming part of the electric conductors connected with the photovoltaic elements. As shown in FIG. 10A this includes a step S3A, wherein contact areas 29a are printed on the surface of the foil. These contact areas 29a may be printed at the same time as printing the other conductive elements. Alternatively, the contact areas as well as other electrically conductive elements may be provided by a subtractive process, e.g. by etching, starting from a continuous electrically conductive layer. FIG. 10B illustrates a step S3B, wherein metal rivets 29 are punched through the foil in the contact areas 29a. Also other slidable contact elements may be provided, such as the elements 30 shown in FIG. 5B.

FIG. 10C illustrates a further step S3C, wherein the structured foil 10 is slidably mounted to a pair of elongated electrically conductive guidance elements 27, 28. In the assembled product, these guidance elements carry the structured foil 10, and they are connectable to external terminals 25, 26.

Figure 11:
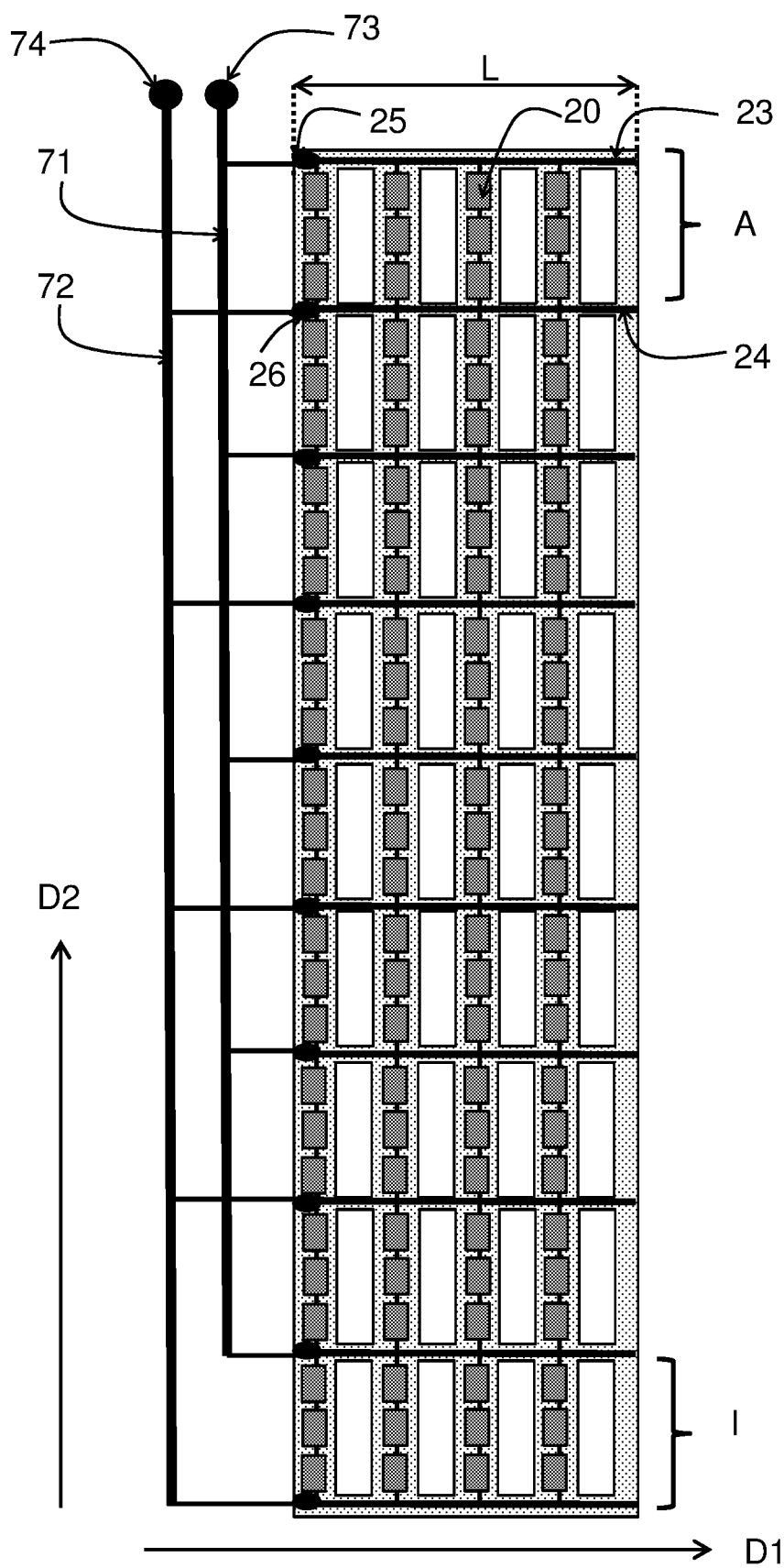

As shown in FIG. 11, in practice the screen 1 may be composed of a plurality of segments A, . . . , I, arranged in the second direction D2, wherein each segment A, . . . , comprises a plurality of sections arranged in the first direction D1 as described above. FIG. 11 illustrates this for the type shown in FIG. 9D, wherein the photovoltaic elements 20 are connectable to external terminals 25, 26 by a pair of busbars 23,24 extending along the connection portions between the slat shaped portions. The external terminals 25, 26 in turn are connected via main conductors 71, 72 to main terminals 73, 74.

Figure 12:
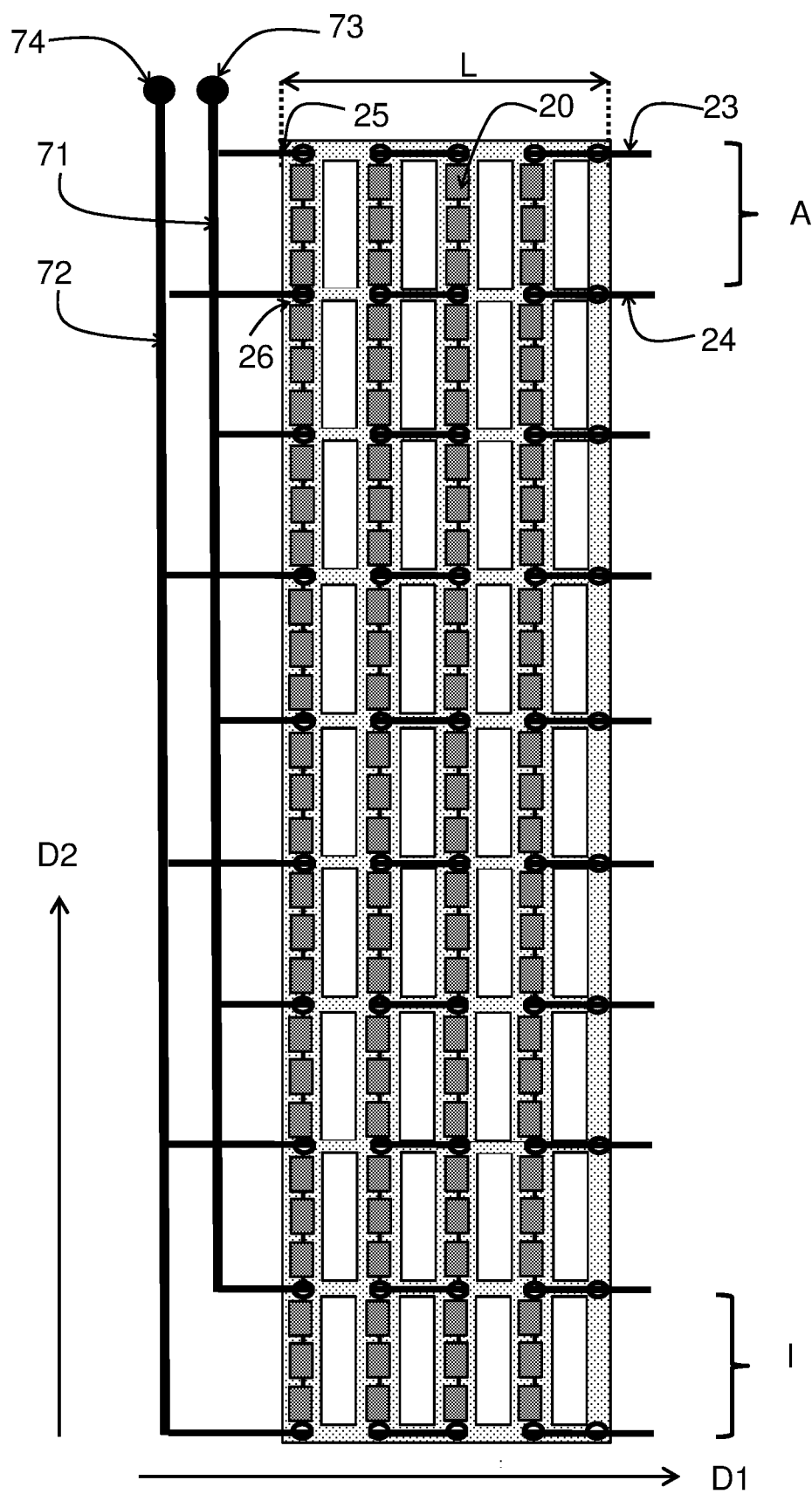

FIG. 12 shows a second example, wherein the photovoltaic elements 20 are connectable to external terminals 25, 26 by a pair of elongated electrically conductive guidance elements 27, 28 carrying the structured foil, which in turn are connected via main conductors 71, 72 to main terminals 73, 74.

Figure 13A:
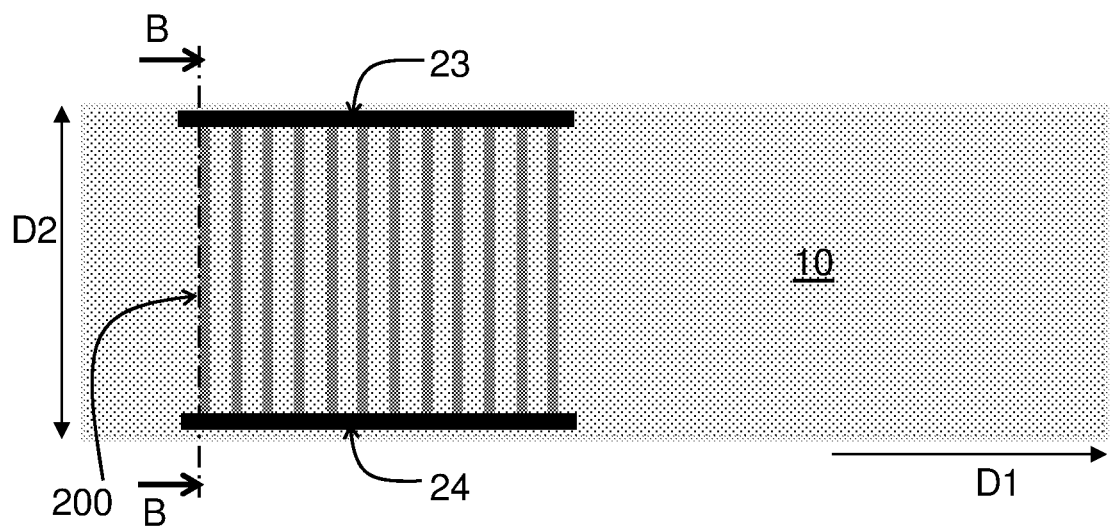
FIG. 13A-13B, illustrates a stage of an embodiment of a method of manufacturing a variable length screen.
Figure 13B:
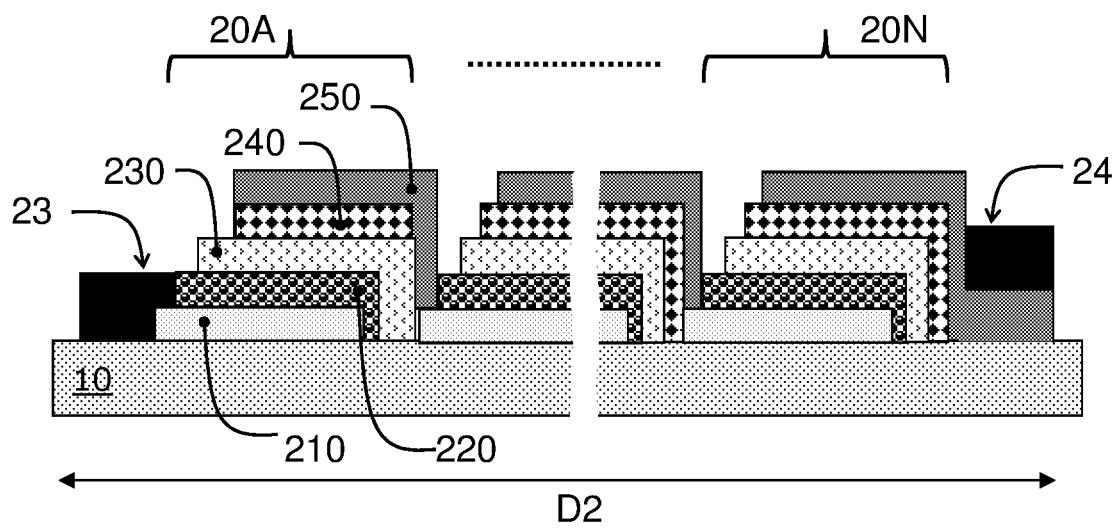

FIG. 13A, 13B show an example of R2R manufacturing of segmented PV modules by direct patterned deposition. By using R2R printing (like e.g. gravure printing, flexo-printing, ink jet printing, offset printing, . . . ), patterned R2R coating (combination of shimmed slot die coating with intermittent slot die coating) or even masked evaporation, segmented PV modules can be in situ created on a flexible web substrate. Patterned printing allows for R2R manufacturing solar cell modules with internal connection, realized by tile wise deposition perpendicular to the web direction of the subsequent printed electro-active layers. In FIG. 13B, reference number 200 represents a string of serially arranged PV modules 20A, . . . , 20N, obtained in this way. This is shown in cross-section BB according to FIG. 13A in FIG. 13B. The strings 200 of serially arranged PV modules 20A, . . . , 20N, are obtained by subsequently depositing a bottom electrode pattern 210, a first charge selective transport layer pattern 220, a photo-active layer pattern 230, a second charge selective transport layer pattern 240, a top electrode pattern 250 and the busbars 23, 24 or other electric contacts for the strings 200, using one of the R2R printing methods referred to. Typically, this may be achieved in that a first deposition device deposits the bottom electrode pattern 210 in an elongate deposition zone extending in the direction D2. Then stream downwards a second deposition device deposits the first charge selective transport layer pattern 220 in that deposition zone, while the first deposition device deposits bottom electrode pattern 210 in a next deposition zone. Then further stream downwards a photo-active layer pattern 230 is deposited in the deposition zone, etc. It can be seen that electrodes 210, 250 of the photovoltaic elements also serve as the electric conductors that connect the photovoltaic elements 20 with the busbars. I.e. in the example shown, the busbar 23 is connected with the bottom electrode 210 of the first photovoltaic element 20A, the top electrode of this photovoltaic element 20A is electrically connected to the bottom electrode of the next photovoltaic element. The top electrode of the one but last photovoltaic element is electrically connected to the bottom electrode of the last photovoltaic element 20N, and the top electrode of the last photovoltaic element 20N is connected to the busbar 24.

Printed internal connections between the individual cells creates in most cases a quite large dead-zone, due to the needed tile-wise deposition of the electro-active PV layers. Decreasing the dead zone can be realized by using the so-called classic P1, P2, P3 scribe (mechanical or by laser), as illustrated in FIG. 14A-14G. Therein FIG. 14A shows a first step, wherein a material suitable for use as a bottom electrode (anode or cathode) is deposited as uniform layer 215. In a next step, shown in FIG. 14B, this layer 215 is patterned over its full depth by grooves extending transverse to the second direction D2. Therewith the layer 215 becomes bottom electrode pattern 210, comprising a plurality of segments arranged with respect to each other in the second direction D2. In subsequent steps, of which the result is shown in FIG. 14C, the layers 225, 235, 245 are deposited uniformly. These comprise a layer 225 of a first charge selective transport material, a layer 235 of a photo-active material, and a layer 245 of a second charge selective transport material. Therewith the first charge selective transport material of layer 225 penetrates the grooves created in the patterning step shown in FIG. 14B. Subsequently, as shown in FIG. 14D, grooves 260 are created, e.g. by laser patterning, through the layers 225, 235 and 245 that extend in said second direction D2 and up to the bottom electrode pattern 210.

Therewith these uniform layers are partitioned into segments arranged in the direction D2 with respect to each other, so as to form a first charge selective transport layer pattern 220, a photo-active layer pattern 230, and a second charge selective transport layer pattern 240. In a next step, shown in FIG. 14E, a material suitable for use as a top electrode (cathode or anode) is deposited as uniform layer 255. The deposited material penetrates through in the grooves 260, and forms electric contacts 265 with the segments in the bottom electrode pattern 210. Then, as shown in FIG. 14F, grooves 270 are formed, e.g. by laser patterning, through the layers 225, 235 and 245 that extend in said second direction D2 and up to the bottom electrode pattern 210. As shown in FIG. 14G, these grooves are filled with an insulating material so as to form separation walls 275. Therewith PV-elements are formed that each comprise a segment of the bottom electrode pattern 210, the first charge selective transport layer pattern 220, the photo-active layer pattern 230, the second charge selective transport layer pattern 240, the top electrode pattern 250. The PV-elements so obtained are connected in series by the electric contacts 265 used for the material of the top electrode pattern 255. Also busbars 23, 24 or other electric contacts for the strings 200, are deposited using one of the R2R printing methods referred to.

FIG. 15A-E illustrates an alternative, so-called back-end interconnection process. This can bring down the number of processing steps needed to realize a PV containing greenhouse screen product. As shown in FIG. 15A, in this case first a stack of uniform layers 215, 225, 235, 245, 255 is deposited prior to any (laser or other) patterning step. After this mono-lithic deposition of the electro-active layers, a back-end interconnection process is applied to create the desired PV module elements. The use of a back-end interconnection approach also allows to further reduce the dead zone of the PV modules. An exemplary implementation of the backend interconnection process is depicted in FIG. 15B to 15E. Therein first and second trenches 272, 274 are formed (See FIG. 15B). The first trenches 272 extend to the bottom electrode layer 215 and the second trenches 274 extend to the substrate 10. Both the first and the second trenches 272, 274 extend over the full width of the deposited layers, so as to partition them into segments arranged along the second direction D2. As shown in FIG. 15C, both the first and the second trenches 272, 274 are filled with an electrically insulating material to provide electrically insulating walls 275. Also insulating walls 275 are provided at the ends of the stack of layers, seen in the direction D2. Next, as shown in FIG. 15D, openings 280, e.g. trenches or holes are scribed between each pair of a first and a second trench 272, 274, extending to the bottom electrode 210 and subsequently, an electrically conductive material is deposited that fills these openings, and provides for an electric connection 280 between the bottom electrode 210 of a photo voltaic element and a top electrode 250 of a subsequent photo voltaic element, therewith connecting them in series.

Figure 16A:
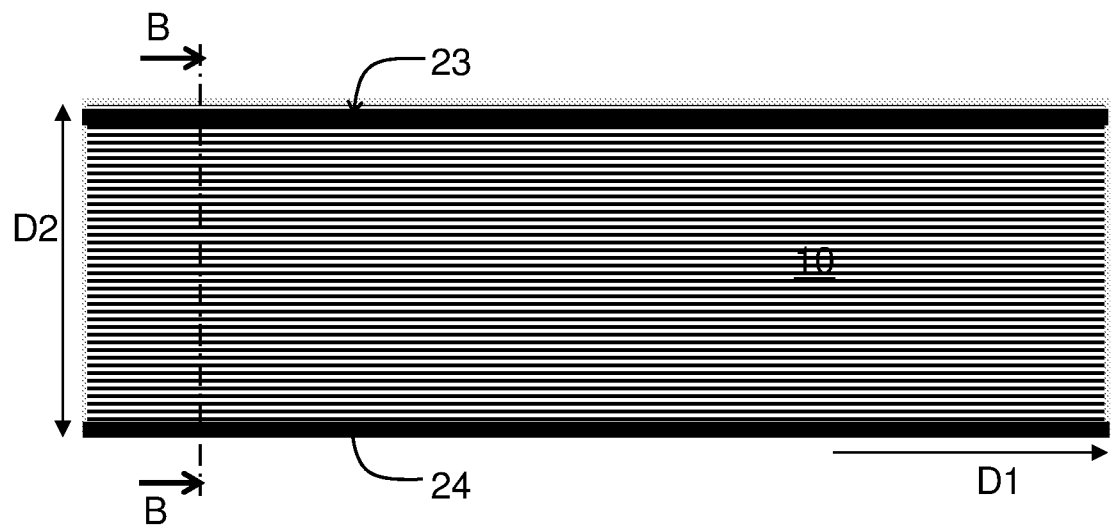
FIG. 16A-16B, illustrates a still further alternative implementation of that stage.
Figure 16B:
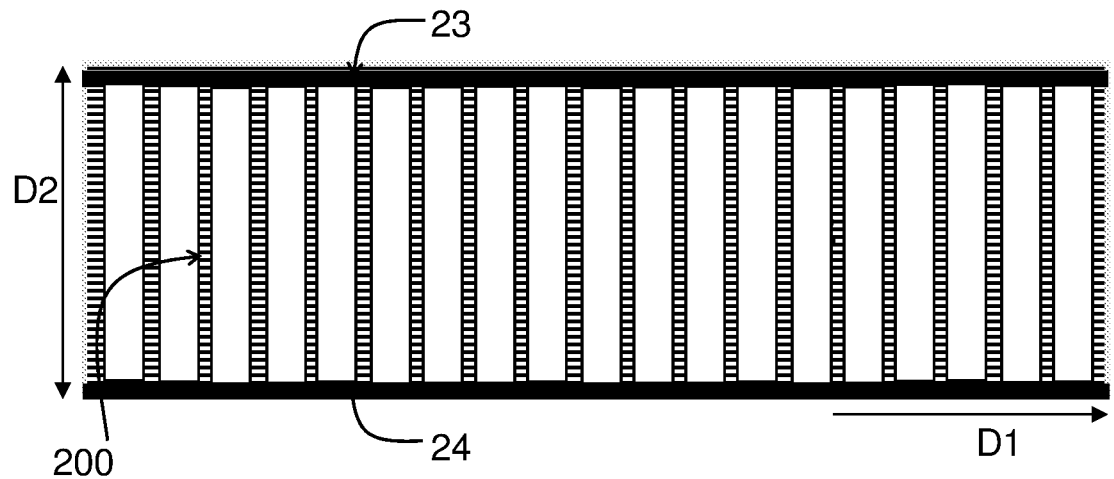

FIG. 16A, 16B shows an alternative embodiment, In a first stage, illustrated in FIG. 16A a direct patterned deposition takes place to deposit a stack of layers as shown in FIG. 13B. Contrary to the situation in FIG. 13B however the deposition takes place in a continuous process, so that in this stage a pattern in the direction D1 is absent. In a next stage, as illustrated in FIG. 16, a patterned removal takes place, e.g. by laser scribing or by another removal process.

Similarly the method described with reference to FIG. 14A to 14G may be modified. I.e. first this earlier described method is used to deposit the patterned layers as shown in FIG. 14G. However, contrary to that embodiment, the pattern is not confined to deposition zones as shown in FIG. 13A that only extend over a few mm or cm, but it extends "endlessly" in the direction D1. Subsequently, the stack so obtained is patterned in the first direction D1, by laser scribing or by another removal process.

In the same way the method described with reference to FIG. 15A to FIG. 15E, can be modified. I.e. the method FIG. 15A to FIG. 15E is modified to provide for a continuous deposition in the direction D1. In a next stage the deposited layer structure of the product obtained, also having the cross-section as shown in FIG. 15E is partitioned in the direction D1.

In again another embodiment in that a stack of layers is provided that extends uniformly in both direction, as in the previous modification. Subsequently when patterning the layers, as shown in FIG. 15B, at the same time material is removed in the areas that are to be come transparent. E.g. in the same processing stage the patterning process partitions the stack into segments that are to be serially connected and into separate sections arranged along the first direction D1.

In the embodiments of FIG. 13-16, a foil carrying a patterned stack of layers is obtained. The stack is patterned both in the direction D1, and in the direction D2. It may be contemplated to obviate the pattern step in the direction D1, and instead to pattern the stack in this direction in the subsequent stage, wherein the foil is structured by sectioning. However, is it is desired to protect the stack against side leakage of atmospheric substances, like moisture and oxygen and the like, it may be desirable to pattern the stack independently, i.e. before sectioning. I.e. in that case it is possible to apply additional layers over the stack that extend beyond the border of the stack.

In the embodiments shown, the PV stack includes bottom electrode pattern 210, a first charge selective transport layer pattern 220, a photo-active layer pattern 230, a second charge selective transport layer pattern 240, a top electrode pattern 250. Embodiments may be contemplated, that use less layers, e.g. by combining certain functionalities in a single layer. Alternatively additional layers may be included to improve functionality, or to provide for protection against damages by atmospheric substances and the like.

The invention claimed is:
1. A screen comprising:
   a structured foil with a front surface and a back surface, defining a plane with a first direction and a second direction transverse to the first direction; and
   a first elongated guidance element and a second elongate guidance element extending in the first direction;
   wherein the foil is structured into mutually integral foil portions in that the foil is cut through along section lines that include:
      a central section line portion, that generally extends in the second direction, and
      end section line portions at both ends of the central section line portion that generally extend in the first direction;
   wherein the mutually integral foil portions include:
      at least a first slat shaped foil portion and a second slat shaped foil portion extending in the second direction at mutually opposite sides of a central section line portion; and
      at least a first connection foil portion and a second connection foil portion,
   wherein the first connection foil portion and the second connection foil portion are each bounded laterally by an outer boundary of the foil and an end portion of a section,
   wherein the first connection foil portion and the second connection foil portion each bridge the first slat shaped foil portion and the second slat shaped foil portion at a respective position in the second direction,
   wherein the first slat shaped foil portion and the second slat shaped foil portion are provided with photovoltaic elements that are connectable to external terminals for supply of electric energy,
   wherein the first slat shaped foil portion and the second slat shaped foil portion are slidably coupled with the first elongate guidance element and the second elongate guidance element to allow the first slat shaped foil portion and the second slat shaped foil portion to slide in the first direction along the first elongate guidance element and the second elongate guidance element, and
   wherein the first connection foil portion and the second connection foil portion are configured to flex in a direction transverse to the first direction and the second direction, so as to allow the first slat shaped foil portion and the second slat shaped foil portion to shift relative to each other in the first direction.
2. The screen according to claim 1, wherein the photovoltaic elements are connectable to external terminals by a pair of busbars extending along the first connection foil portion and the second connection foil portion.

3. The screen according to claim 1, wherein the first elongate guidance element and the second elongate guidance element are electrically conductive, and
   wherein the photovoltaic elements are connectable to external terminals by the first guidance element and the second guidance element.

4. The screen according to claim 1, wherein each of the first and second slat shaped foil portions has a main region and an extension region,
   wherein the extension region is a region extending with a convex hull of a section line between one of the first and second slat shaped foil portions and a subsequent slat shaped foil portion.

5. The screen according to claim 4, wherein the extension region is provided with perforations.

6. The screen according to claim 1 wherein the screen is at least configurable to be in an extended state and in a contracted state,
   wherein in the contracted state, the screen has a first length, and wherein the slat shaped foil portions are subsequently alternately rotated clockwise and anti-clockwise along an axis parallel to the second direction, therewith curving the connection foil portions, and
   wherein in the extended state, the screen has a second length greater than the first length, and wherein the slat shaped foil portions and the connection foil portions are substantially arranged in the plane defined by the first and the second direction.

7. The screen according to claim 6, wherein the screen is further configurable in a super extended state
   wherein, while in the super extended state:
      the screen has a third length greater than the second length,
      the slat shaped foil portions and the connection foil portions are substantially arranged in the plane defined by the first and the second direction, and
      the connection foil portions are stretched in the first direction.

8. A variable length screen system comprising:
   a screen comprising:
      a structured foil with a front surface and a back surface defining a plane with a first direction and a second direction transverse to the first direction; and
      a first elongated guidance element and a second elongate guidance element extending in the first direction;
      wherein the foil is structured into mutually integral foil portions in that the foil is cut through along section lines that include:
         a central section line portion, that generally extends in the second direction, and
         end section line portions at both ends of the central section line portion that generally extend in the first direction;
      wherein the mutually integral foil portions include:
         at least a first slat shaped foil portion and a second slat shaped foil portion extending in the second direction at mutually opposite sides of a central section line portion; and
         at least a first connection foil portion and a second connection foil portion,
      wherein the first connection foil portion and the second connection foil portion are each bounded laterally by an outer boundary of the foil and an end portion of a section,
      wherein the first connection foil portion and the second connection foil portion each bridge the first slat shaped foil portion and the second slat shaped foil portion at a respective position in the second direction,
      wherein the first slat shaped foil portion and the second slat shaped foil portion are provided with photovoltaic elements that are connectable to external terminals for supply of electric energy,
      wherein the first slat shaped foil portion and the second slat shaped foil portion are slidably coupled with the first elongate guidance element and the second elongate guidance element to allow the first slat shaped foil portion and the second slat shaped foil portion to slide in the first direction along the first elongate guidance element and the second elongate guidance element, and
      wherein the first connection foil portion and the second connection foil portion are configured to flex in a direction transverse to the first direction and the second direction, so as to allow the first slat shaped foil portion and the second slat shaped foil portion to shift relative to each other in the first direction;
   wherein the screen is at least configurable to be in an extended state and in a contracted state,
      wherein in the contracted state, the screen has a first length, and wherein the slat shaped foil portions are subsequently alternately rotated clockwise and anti-clockwise along an axis parallel to the second direction, therewith curving the connection foil portions, and
      wherein in the extended state, the screen has a second length greater than the first length, and wherein the slat shaped foil portions and the connection foil portions are substantially arranged in the plane defined by the first and the second direction; and
   an actuator device for exerting a force on the screen according to the first direction to change a configuration of the screen from an extended state to a contracted state and/or from a contracted state to an extended state.

9. The variable length screen system according to claim 8, further comprising the at least one actuator device for exerting a force according to the first direction to change a configuration of the screen from an extended state to a super extended state and/or from a super extended state to an extended state.

10. A method of manufacturing a variable screen comprising:
   providing a foil of a flexible material, the foil having a front surface and a back surface and defining a plane with a first direction and a second direction transverse to the first direction;
   providing the foil with a plurality of photovoltaic elements, by deposition of a first electrode layer, a photovoltaic layer and a second electrode layer on the foil;
   providing the foil with a plurality of electric conductors connected with the plurality of photovoltaic elements, thereby enabling connection of the plurality of photovoltaic elements to external terminals for supply of electric energy;
   structuring the foil into mutually integral foil portions by cutting through the foil along section lines that include:
      a central section line portion, that generally extends in the second direction, and
      end section line portions at both ends of the central section line portion that generally extend in the first direction;

wherein the mutually integral foil portions include:
- at least a first slat shaped foil portion and a second slat shaped foil portion extending in the second direction at mutually opposite sides of a central section line portion; and
- at least a first connection foil portion and a second connection foil portion,
- wherein the first connection foil portion and the second connection foil portion are each bounded laterally by an outer boundary of the foil and an end portion of a section,
- wherein the first connection foil portion and the second connection foil portion each bridge the first slat shaped foil portion and the second slat shaped foil portion at a respective position in the second direction,
- wherein the first slat shaped foil portion and the second slat shaped foil portion are provided with the plurality of photovoltaic elements, and
- slidingly coupling the first slat shaped foil portion and the second slat shaped foil portion with a first elongate guidance element and a second elongate guidance element that extend in the first direction, to allow the slat shaped foil portions to slide in the first direction along the guidance elements.

11. The method according to claim 10, wherein the providing the foil with electric conductors connected with the photovoltaic elements, further comprises providing slidable contact elements.

12. The method according to claim 11, wherein the providing the foil with electric conductors connected with the photovoltaic elements further comprises slidably mounting the structured foil to a pair of elongated electrically conductive guidance elements for carrying the structured foil, and wherein the pair of elongated electrically conductive guidance elements are connectable to external terminals.

* * * * *